US010861164B1

(12) United States Patent
Mishra et al.

(10) Patent No.: US 10,861,164 B1
(45) Date of Patent: Dec. 8, 2020

(54) VISUALLY DETERMINING VIBROMETRIC BEHAVIOR OF AERIAL VEHICLES

(71) Applicant: Amazon Technologies, Inc., Seattle, WA (US)

(72) Inventors: Pragyana K. Mishra, Seattle, WA (US); Kevin Kuang-Hui Tseng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 16/367,594

(22) Filed: Mar. 28, 2019

(51) Int. Cl.

| | |
|---|---|
| ***G06T 7/20*** | (2017.01) |
| ***G01H 9/00*** | (2006.01) |
| ***B64C 39/02*** | (2006.01) |
| ***G06T 7/50*** | (2017.01) |

(52) U.S. Cl.
CPC .............. *G06T 7/20* (2013.01); *B64C 39/024* (2013.01); *G01H 9/008* (2013.01); *G06T 7/50* (2017.01); *G06T 2207/10016* (2013.01); *G06T 2207/30248* (2013.01)

(58) Field of Classification Search
CPC .......... B64C 27/08; H04N 7/185; A61B 5/18; G06K 9/00234; G06K 9/00261; G06K 9/00832
USPC ............... 310/321, 328; 345/474; 348/218.1, 348/211.3; 381/332; 340/12.3; 356/336, 356/338
See application file for complete search history.

(56) References Cited

U.S. PATENT DOCUMENTS

| | | | |
|---|---|---|---|
| 4,895,448 A | 1/1990 | Laird | |
| 6,622,135 B1 | 9/2003 | Tremiolles et al. | |
| 10,053,236 B1 | 8/2018 | Buchmueller et al. | |
| 10,496,893 B2 * | 12/2019 | Diamond | G06K 9/3233 |
| 2007/0280501 A1 | 12/2007 | Walton | |
| 2010/0235037 A1 | 9/2010 | Vian et al. | |
| 2011/0063950 A1 * | 3/2011 | Greenleaf | A61B 8/485 367/87 |
| 2012/0250010 A1 | 10/2012 | Hannay | |
| 2014/0067164 A1 | 3/2014 | Papadopoulos et al. | |

(Continued)

OTHER PUBLICATIONS

Wadhwa, N., Rubinstein, M., Durand, F., and Freeman, W.T. "Phase-Based Video Motion Processing," MIT Computer Science & Artificial Intelligence Lab, ACM Transactions on Graphics, vol. 32, issue 4, New York, N.Y., Jul. 2013, 9 pages.

(Continued)

*Primary Examiner* — Kiet M Doan
(74) *Attorney, Agent, or Firm* — Athorus, PLLC

(57) ABSTRACT

Natural frequencies of vibration of objects, such as aerial vehicles, are identified based on imaging data captured while the objects are subjected to excitation. The imaging data is captured using high-speed cameras, and changes in intensities of pixels corresponding to surfaces of the object are used to determine a spectral diagram of the vibrations from which natural frequencies of vibration (e.g., vibration modes) are determined. The visibility of the vibrating objects is enhanced by providing video images to band-pass filters within small bands around the natural frequencies, and magnifying the vibration based on the amplitudes or phases determined from each of the video images. A stream of the modified video images may be used to determine a mode shape corresponding to the vibration of the objects at or around a natural frequency of vibration.

20 Claims, 27 Drawing Sheets

AERIAL VEHICLE SUBJECTED TO EXTERNAL EXCITATION OVER FREQUENCY RANGE

(56) References Cited

U.S. PATENT DOCUMENTS

| | | | |
|---|---|---|---|
| 2015/0336671 | A1 | 11/2015 | Winn et al. |
| 2015/0355101 | A1 | 12/2015 | Sun |
| 2016/0003954 | A1 | 1/2016 | Broussard et al. |
| 2016/0093124 | A1 | 3/2016 | Shi et al. |
| 2016/0264262 | A1 | 9/2016 | Colin et al. |
| 2016/0376031 | A1 | 12/2016 | Michalski et al. |
| 2016/0379154 | A1 | 12/2016 | Rodoni |
| 2017/0328838 | A1 | 11/2017 | Umehara |
| 2018/0068433 | A1 | 3/2018 | Imakoga |
| 2018/0322366 | A1 | 11/2018 | Lim et al. |
| 2019/0228667 | A1 * | 7/2019 | Matsumoto ........... B64C 39/024 |

OTHER PUBLICATIONS

Wu, H.-Y., Rubinstein, M., Shih, E., Guttag, J., Durand, F., Freeman, W. "Eulerian Video Magnification for Revealing Subtle Changes in the World," ACM Transactions on Graphics, vol. 31, No. 4, New York, N.Y., Jul. 2012, 8 pages.

A. Krizhevsky, I. Sutskever, and G. E. Hinton. Imagenet classification with deep convolutional neural networks. NIPS '12 Proceedings of the 25th Int'l Conference on Neural Information Processing Systems (vol. 1), Lake Tahoe, Nevada, pp. 1097-1105, 2012.

A. Radford, L. Metz, and S. Chintala. Unsupervised Representation Learning with Deep Convolutional Generative Adversarial Networks. Submitted as Conference Paper for ICLR 2016, San Juan, Puerto Rico, May 2-4, 2016.

A. Shrivastava, T. Pfister, O. Tuzel, J. Susskind, W. Wang, and R. Webb. Learning from Simulated and Unsupervised Images through Adversarial Training. Submitted Nov. 15, 2016, for oral presentation at Conference on Computer Vision and Pattern Recognition (CVPR 2017), Honolulu, Hawaii; presented at CVPR 2017 on Jul. 23, 2017.

B. Zhou, A. Khosla, A. Lapedriza, A. Oliva, and A. Torralba. Learning Deep Features for Discriminative Localization. In Proceedings of the IEEE Conference on Computer Vision and Pattern Recognition (CVPR 2016), Las Vegas, Nevada, pp. 2921-2929, IEEE 2016.

D. Soukup and R. Huber-Mörk. Convolutional Neural Networks for Steel Surface Defect Detection from Photometric Stereo Images, pp. 668-677. Advances in Visual Computing, 10th Int'l Symposium (ISVC 2014), Las Vegas, Nevada, Dec. 8-10, 2014. Springer International Publishing, Switzerland, 2014 (LNCS 8887).

D. Kingma and J. Ba. Adam: A Method for Stochastic Optimization, the Hebrew University of Jerusalem, Advanced Seminar in Deep Learning, Oct. 18, 2015.

D. Kingma and J. Ba. Adam: A method for stochastic optimization. Published at the 3rd International Conference for Learning Representations (ICLR 2015), San Diego, May 9, 2015.

D. Martin. A Practical Guide to Machine Vision Lighting, Advanced Illumination, Rochester, Vt., Feb. 2012.

D. Mery and M.A. Berti. Automatic Detection of Welding Defects Using Texture Features. Insight-Non-Destructive Testing and Condition Monitoring, 45(10):676-681, 2003. Presented at Int'l Symposium on Computed Tomography and Image Processing for Industrial Radiology, Berlin, Germany, Jun. 23-25, 2003.

D. Sammons, W.P. Winfree, E. Burke, and S. Ji. Segmenting delaminations in carbon fiber reinforced polymer composite CT using convolutional neural networks. AIP Conference Proceedings, vol. 1706, p. 110014. American Institute of Physics, AIP Publishing, 2016.

D. Vernon. Machine Vision: Automated Visual Inspection and Robot Vision. Automatica, vol. 30, No. 4, pp. 731-732 (1994), Elsevier Science, Ltd., Great Britain.

D. Wang, A. Khosla, R. Gargeya, H. Irshad, and A. H. Beck. Deep Learning for Identifying Metastatic Breast Cancer. Computer Research Repository (CoRR), Jun. 18, 2016.

Freeman, William T., and Adelson, Edward H. "The Design and Use of Steerable Filters," IEEE Transactions on Pattern Analysis and Machine Intelligence, vol. 13, No. 9, Sep. 1991, 16 pages.

G. Wang and T. Liao. Automatic identification of different types of welding defects in radiographic images. NDT&E International, 35(8):519-528 (2002), Elsevier Science Ltd., Great Britain.

H. Raafat and S. Taboun. An Integrated Robotic and Machine Vision System for Surface Flaw Detection and Classification. Computers & Industrial Engineering, Elsevier Science Ltd., Great Britain, 30(1):27-40, 1996.

I. Goodfellow, J. Pouget-Abadie, M. Mirza, B. Xu, D. Warde-Farley, S. Ozair, A. Courville, and Y. Ben-gio. Generative adversarial nets. Advances in Neural Information Processing Systems (NIPS 2014), pp. 2672-2680, 2014.

J. Deng, W. Dong, R. Socher, L.-J. Li, K. Li, and L. Fei-Fei. Imagenet: A large-scale hierarchical image database. In IEEE Conference on Computer Vision and Pattern Recognition, 2009 (CVPR 2009), Miami, Florida, pp. 248-255. IEEE 2009.

J. Long, E. Shelhamer, and T. Darrell. Fully Convolutional Networks for Semantic Segmentation. In Proceedings of the IEEE Conference on Computer Vision and Pattern Recognition (CVPR 2015), Boston, Mass., pp. 3431-3440, IEEE 2015.

J. Masci, U. Meier, D. Ciresan, J. Schmidhuber, and G. Fricout. Steel Defect Classification with Max-Pooling Convolutional Neural Networks. The 2012 International Joint Conference on Neural Networks (IJCNN), Brisbane, Australia, pp. 1-6. IEEE, Jun. 2012.

J. Redmon, S. Divvala, R. Girshick, and A. Farhadi. You Only Look Once: Unified, Real-Time Object Detection. Proceedings of the 2016 IEEE Conference on Computer Vision and Pattern Recognition (CVPR 2016), Las Vegas, Nevada, pp. 779-788, IEEE 2016.

K. He, X. Zhang, S. Ren, and J. Sun. Deep Residual Learning for Image Recognition. In Proceedings of the IEEE Conference on Computer Vision and Pattern Recognition (CVPR 2016), Las Vegas, Nevada, pp. 770-778, IEEE 2016.

K. Simonyan and A. Zisserman. Very Deep Convolutional Networks for Large-Scale Image Recognition. Submitted Sep. 4, 2014, for publication at 3d Int'l Conference on Learning Representations (ICLR 2015), San Diego, California. Presented May 7-9, 2015.

N. Srivastava, G. E. Hinton, A. Krizhevsky, I. Sutskever, and R. Salakhutdinov. Dropout: A Simple Way to Prevent Neural Networks from Overfitting. Journal of Machine Learning Research, 15(1):1929-1958, 2014.

S. Ioffe and C. Szegedy. Batch normalization: Accelerating deep network training by reducing internal covariate shift. In Proceedings of the 32nd International Conference on Machine Learning, Lille, France, pp. 448-456, 2015.

T.-Y. Lin, A. RoyChowdhury, and S. Maji. Bilinear CNN Models for Fine-Grained Visual Recognition. Proceedings of the 2015 IEEE International Conference on Computer Vision (ICCV), Santiago, Chile, pp. 1449-1457, IEEE 2015.

T.-Y. Lin, P. Goyal, R. Girshick, K. He, and P. Dollar. Focal Loss for Dense Object Detection. IEEE International Conference on Computer Vision (2017), pp. 966-974, IEEE 2017.

Y. Gao, O. Beijbom, N. Zhang, and T. Darrell. Compact bilinear pooling. In Proceedings of the IEEE Conference on Computer Vision and Pattern Recognition (CVPR 2016), Las Vegas, Nevada, pp. 317-326, IEEE 2016.

Y. Liu, K. Gadepalli, M. Norouzi, G.E. Dahl, T. Kohlberger, A. Boyko, S. Venugopalan, A. Timofeev, P.Q. Nelson, G.S. Corrado, et al. Detecting Cancer Metastases on Gigapixel Pathology Images. Google Research, Mar. 8, 2017.

* cited by examiner

AERIAL VEHICLE SUBJECTED TO EXTERNAL EXCITATION OVER FREQUENCY RANGE

POWER SPECTRAL DENSITY DETERMINED FROM DIFFERENCES IN PIXEL INTENSITIES

MULTIPLY EACH PHASE BY AMPLIFICATION FACTOR $\alpha$ $\alpha \cdot \phi(t_1)$ →

$\alpha \cdot \phi(t_2)$ →

$\alpha \cdot \phi(t_3)$ →

$\alpha \cdot \phi(t_4)$ →

MAGNIFY FILTERED PORTIONS BASED ON AMPLIFIED PHASES

VIBRATIONS OF PORTIONS OF AERIAL VEHICLE MAGNIFIED BASED ON PHASE

VISUALLY DETERMINING VIBROMETRIC BEHAVIOR OF AERIAL VEHICLES

BACKGROUND

Aerial vehicles such as airplanes or helicopters and their components vibrate during take-off evolutions, while transitioning between horizontal and vertical flight modes, upon encountering turbulent conditions in flight, or during landing evolutions. Excitations that cause vibrations of aerial vehicles may emanate from rotors, actuators, control surfaces, turbulent airflows, or any type or form of intrinsic or extrinsic disturbances. Such vibrations are typically exacerbated at natural frequencies or natural vibrational modes for the aerial vehicles, or for one or more components.

An aerial vehicle tends to have a set of natural frequencies of vibration, e.g., frequencies at which resonance occurs, and comparatively large-scale vibrations are observed. The discrete natural frequencies of a set that are associated with a specific aircraft necessarily depend upon structural properties (e.g., geometrical and material properties) of the aircraft, and each aircraft may have a unique set of natural frequencies of its vibrational modes. Moreover, an aircraft's natural frequencies of vibration may change over time for any number of reasons or according to any number of factors. Anticipating or reducing vibrations at such frequencies are critical to ensuring the functionality and safety of the aerial vehicle, for vibrations may typically not be readily detected until the aircraft is in one of its natural vibrational modes. By that time, the aircraft may be experiencing servo-elastic oscillations or other hazardous effects that threaten the integrity of the aircraft, and may prevent the aircraft from successfully recovering from such oscillations.

DETAILED DESCRIPTION

Figure 1A:
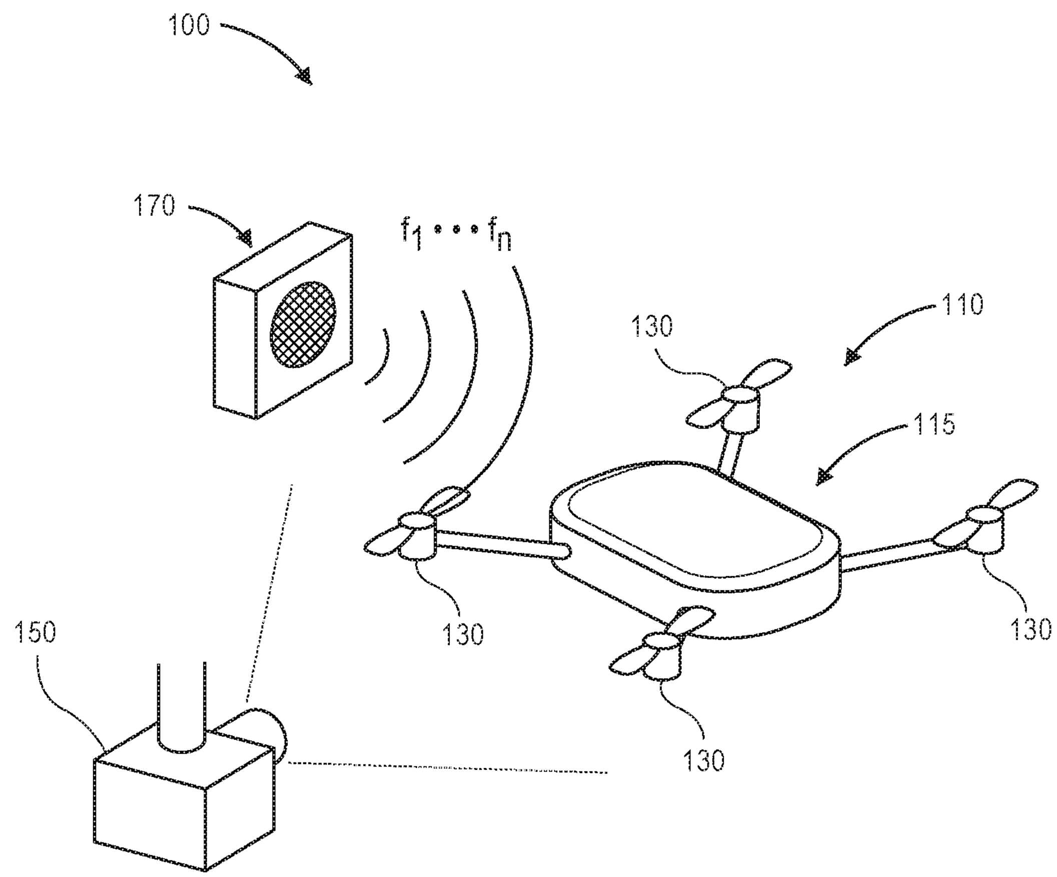
FIGS. 1A through 1K are views of aspects of one system for visually determining vibrometric behavior of objects in accordance with embodiments of the present disclosure.

As is set forth in greater detail below, the present disclosure is directed to determining vibrometric behavior of objects, such as aerial vehicles, using imaging data. More specifically, some embodiments of the present disclosure are directed to determining one or more natural frequencies of vibration or natural vibrational modes of an object by subjecting the object to excitation (e.g., extrinsic or intrinsic excitation) and capturing imaging data as the object is subjected to the excitation. One or more pixels of an image plane that correspond to surfaces of an object are selected, and a plurality of digital images that are captured as the object is subjected to excitation are processed to determine changes in the intensities of the pixels from image to image. A time series of the intensities across the images is determined, and the time series is transformed, e.g., by a fast Fourier transform, to determine a power spectral density of the object. The power spectral density depicts the locations and attributes of the vibrational power of the object, as a function of frequency, and the natural frequencies of vibration or natural vibrational modes correspond to frequencies at which absolute or local maximum levels of power are observed.

Once the natural frequencies of vibration or natural vibrational modes are determined for an object from imaging data, motion of an object may be magnified according to a phase-based video amplification algorithm. For example, a video image may be filtered, e.g., by a band-pass filter having a small frequency band applied about one of the natural frequencies of vibration, thereby isolating the vibration to only those that are observed at or around one of the natural frequencies. Portions of the visual image that are vibrating at or around the one of the natural frequencies may be identified and extracted therefrom, and processed to determine amplitudes and phases of the vibration of respective portions of the object, e.g., using a steerable filter-based method. Subsequently, phases of vibration expressed in such portions may be multiplied by an amplification factor, and differences in phases observed at different points on a surface of the object in the same image, or at common points in each of a plurality of video images, may be magnified accordingly. A modified video image that depicts the extracted portions of the visual image depicting vibrations at or around one of the natural frequencies, magnified based on the phases of such vibrations, and a difference image from which such portions were distracted, may be generated. A plurality of modified video images may be combined into a stream, thereby providing a visual tool identifying locations on surfaces of the object that are most affected by vibration at the natural frequencies. Additionally, mode shapes of vibration of the object at natural frequencies, in the form of one or more three-dimensional curves or other representations of vibration, may be determined from the modified video images.

Accordingly, the systems and methods of the present disclosure may be used to preempt harmful oscillations of an object, such as an aerial vehicle and its respective components, by predicting when such oscillations will occur, and by taking one or more actions in response to avoid the oscillations. For example, where the effects of vibration at natural frequencies are determined for an aerial vehicle that is constructed according to an established design or set of requirements for vehicles of a class including the aerial vehicle, or a prototype of the vehicles of the class, one or more changes to the design or the set of requirements, e.g., one or more material components, dimensions or other attributes of the aerial vehicle, or a manner in which the aerial vehicle is constructed, may be implemented prior to constructing another aerial vehicle according to the design or the set of requirements. Alternatively, where an aerial vehicle is operational, and one or more natural frequencies of vibration are determined for the aerial vehicle, or where locations at which vibrations are most likely to physically manifest themselves are determined, effects of such vibrations may be mitigated by adding weight to or removing weight from the aerial vehicle, changing one or more components of the aerial vehicle, e.g., to stiffen or loosen a frame or other element of construction, or operationally modifying the aerial vehicle, such as to impose one or more operating constrains on the aerial vehicle, or to limit or restrict operations of the aerial vehicle at airspeeds or altitudes or with motor speeds that are known or determined to cause the aerial vehicle to experience such vibrations. Furthermore, a mode shape of vibrations may be calculated for a structure at a given vibrational frequency, and the mode shape may be used to identify areas of a structure where harmful impacts of such vibrations are potentially maximized.

Referring to FIGS. 1A through 1K, views of aspects of one system 100 for visually determining vibrometric behavior of objects in accordance with embodiments of the present disclosure are shown. As is shown in FIG. 1A, the system 100 includes an aerial vehicle 110 (e.g., an unmanned aerial vehicle, or drone), an imaging device 150 (e.g., a digital camera) and an acoustic speaker 170 (or another excitation source). The aerial vehicle 110 includes a frame 115 having a plurality of motors 130 coupled thereto. Each of the motors 130 is coupled to a propeller or other rotor by a drive shaft and configured to rotate the propeller about an axis defined by the drive shaft. The imaging device 150 is aligned to include all or portions of the aerial vehicle 110 within a field of view.

The acoustic speaker 170 is also aligned to project acoustic energy in the form of sounds having any frequency, wavelength or intensity upon one or more portions of the aerial vehicle 110. Alternatively, in lieu of the acoustic speaker 170, or in addition to the acoustic speaker 170, any other excitation source that is configured to excite the aerial vehicle 110 at known, selected frequencies with the aerial vehicle 110 within a field of view of the imaging device 150, e.g., by direct contact with the aerial vehicle 110 or in any other manner, may be utilized to impart excitation upon the aerial vehicle 110. For example, in some embodiments, one or more of the motors 130 may act as an excitation source for the aerial vehicle 110, where such motors 130 may be specifically controlled to impart excitation upon the aerial vehicle 110 at one or more selected frequencies within a known, defined range.

The acoustic speaker 170 may be programmed with an excitation schedule or other set of instructions by which acoustic energy may be projected at constant or varying intensities and over a defined range of frequencies $f_1 \ldots f_n$, e.g., linearly, according to a step function, a delta function, or in any other manner. For example, in some embodiments, the acoustic speaker 170 may excite the aerial vehicle 110 by acoustic energy at a selected frequency for a predetermined period of time to enable imaging data to be captured and/or processed using the imaging device 150, before exciting the aerial vehicle 110 at another selected frequency.

Figure 1B:
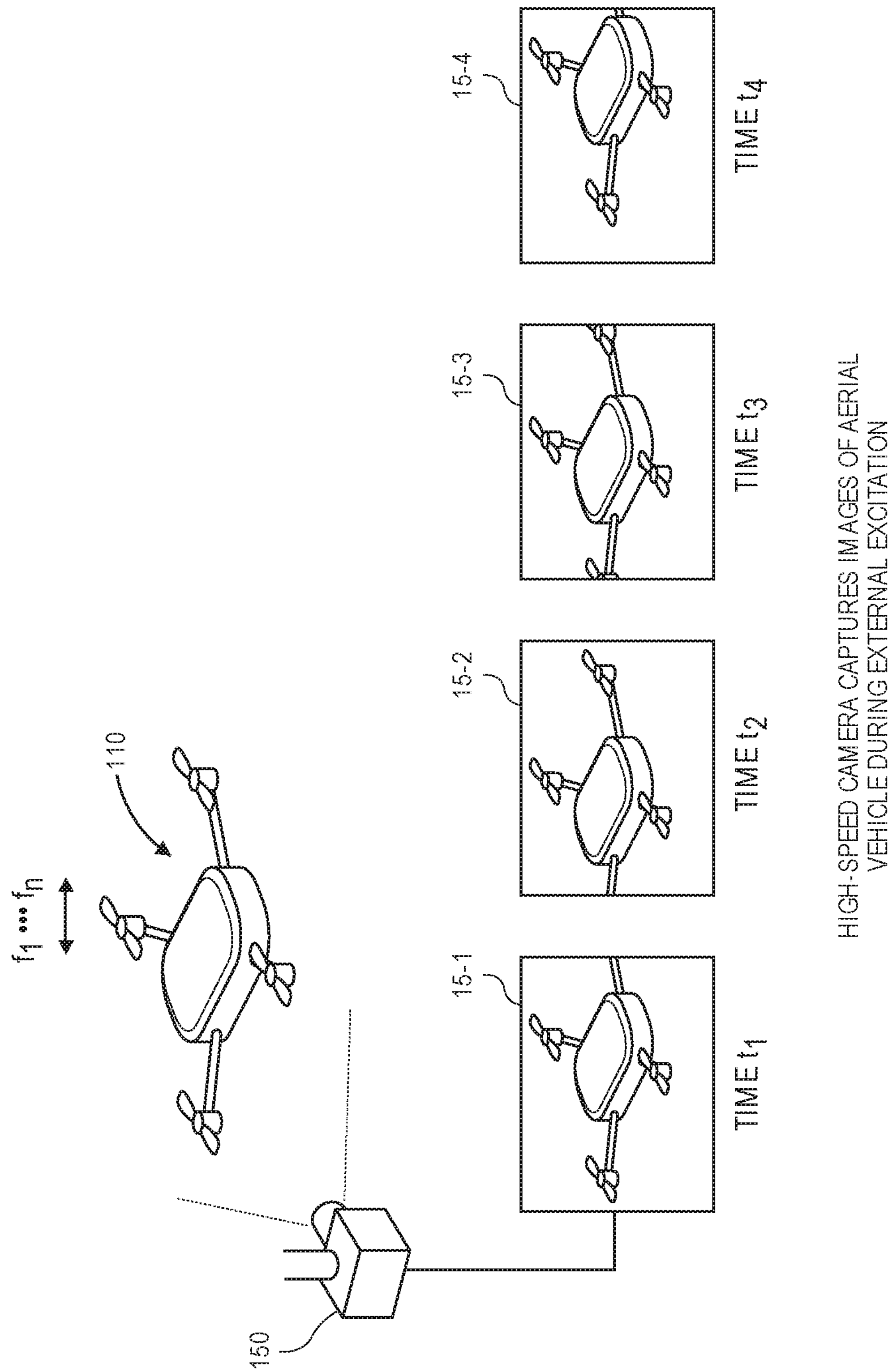

As is shown in FIG. 1B, as the acoustic speaker 170 imparts acoustic energy upon the aerial vehicle 110 over the defined range of frequencies $f_1 \ldots f_n$, a first plurality of images 15-1, 15-2, 15-3, 15-4 are captured at times $t_1$, $t_2$, $t_3$, $t_4$ by the imaging device 150. In some embodiments, the imaging device 150 may be programmed or configured to capture digital images at a high speed or frame rate, such as two thousand frames per second (2,000 fps), four thousand frames per second (4,000 fps), or greater. In some embodiments, the speed or frame rate at which the imaging device 150 captures the images 15-1, 15-2, 15-3, 15-4 is preferably at least twice a maximum frequency of the excitation.

Figure 1C:
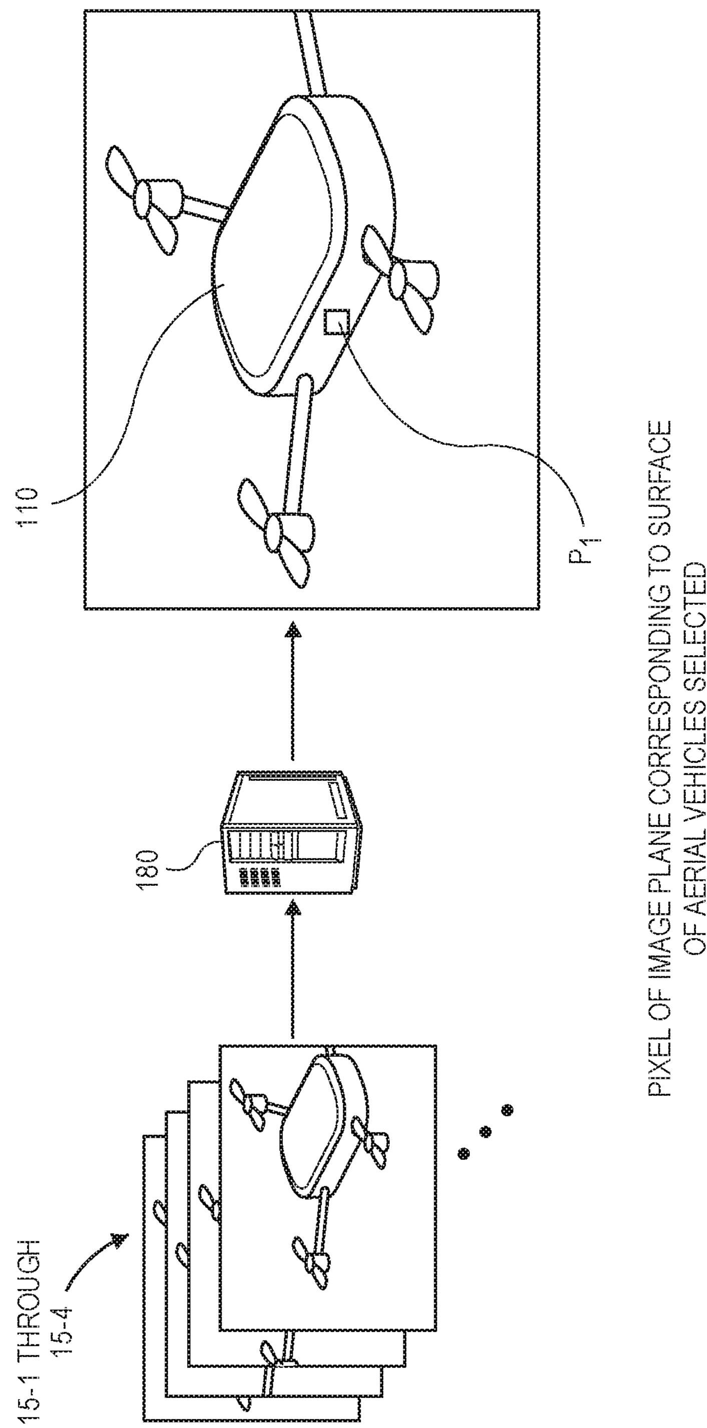

In accordance with some embodiments of the present disclosure, vibrations or other motion of a portion of an object, such as an aerial vehicle (e.g., the aerial vehicle 110), may be determined by selecting one or more pixels of an image plane of a digital camera or other imaging device (e.g., the imaging device 150) corresponding to the portion of the object, capturing digital images of the object, and determining intensities of the pixels. As is shown in FIG. 1C, the plurality of images 15-1, 15-2, 15-3, 15-4 are provided to a server 180, e.g., over a network, and a pixel (or collection of pixels) $P_1$ of an image plane that corresponds to one or more external surfaces of the aerial vehicle 110 is selected from the plurality of images 15-1, 15-2, 15-3, 15-4. The pixel $P_1$ may be selected on any basis, including properties or features of the aerial vehicle 110 that are depicted in the pixel $P_1$ (e.g., a specific surface of the aerial vehicle 110) and for which vibration or motion properties are desired. In some embodiments, the pixel (or pixels) $P_1$ may be clustered at or around a single portion of the aerial vehicle 110 for which vibration or motion properties are desired. For example, the pixel $P_1$ shown in FIG. 1C may correspond to a single image pixel at a specific location in an image plane of the imaging device 150, or, alternatively, a collection of pixels at the specific location, and may be selected in order to generally evaluate the vibration or motion properties of the aerial vehicle 110 at the specific location. Alternatively, the pixel (or pixels) $P_1$ may be distributed throughout or across one or more surfaces of the aerial vehicle 110, and selected in order to generally evaluate the vibration or motion properties of the aerial vehicle 110 at multiple locations on the one or more surfaces.

Figure 1D:
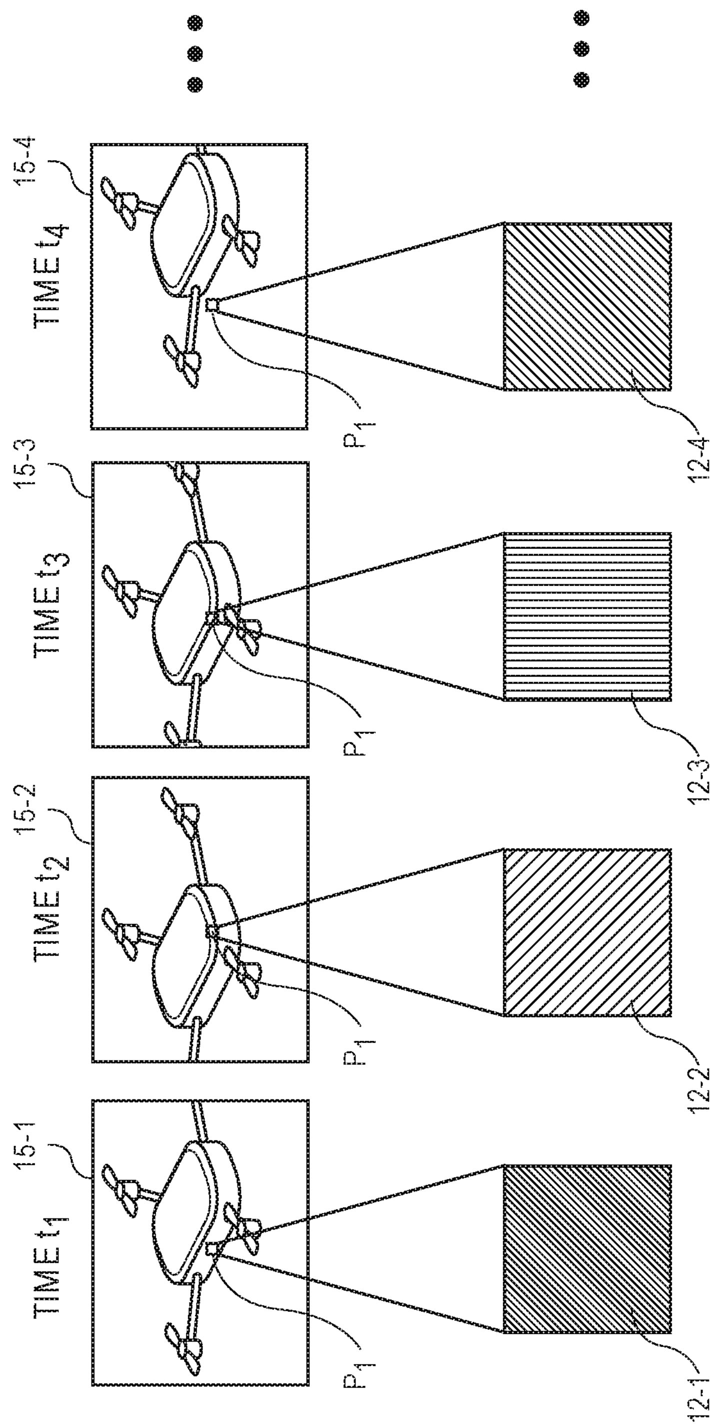
Figure 1E:
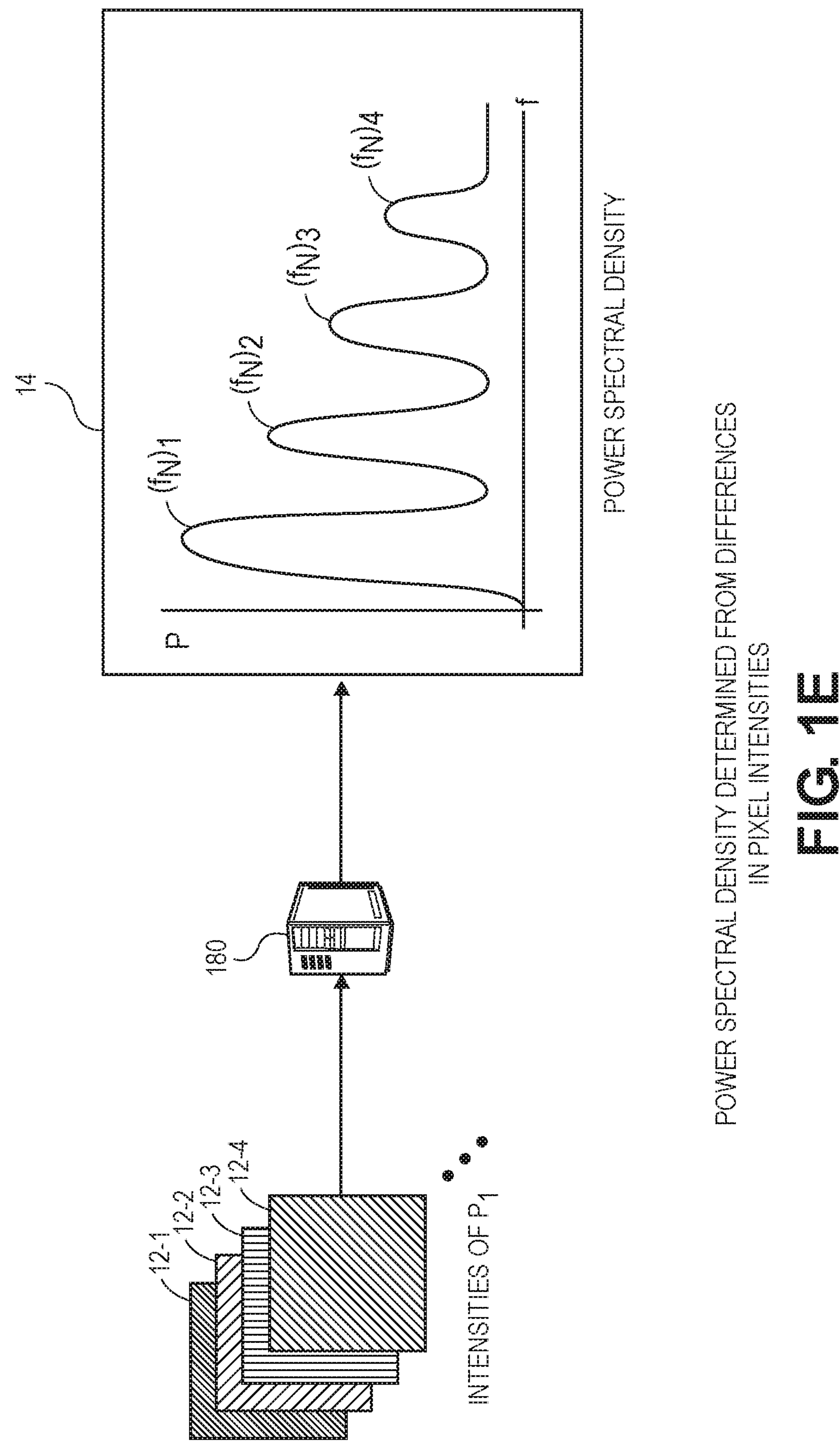

As is shown in FIG. 1D, a plurality of intensities 12-1, 12-2, 12-3, 12-4 of the pixel $P_1$ in the respective images 15-1, 15-2, 15-3, 15-4 is determined. Due to the excitation by the excitation source 170, portions of the aerial vehicle 110 corresponding to the pixel $P_1$ appear differently from image to image, in a repeated or oscillating manner. As is shown in FIG. 1E, the intensities 12-1, 12-2, 12-3, 12-4 of the pixel $P_1$ within each of such images captured during the excitation of the aerial vehicle 110 over the range of frequencies $f_1 \ldots f_n$ may, therefore, be used to determine a power spectral density 14 of the aerial vehicle 110, e.g., by transforming the intensities 12-1, 12-2, 12-3, 12-4. For example, in some embodiments, a time series of the intensities of the pixel $P_1$, e.g., a set of values of such intensities and the corresponding times at which images having the pixel $P_1$ with such intensities were captured, may be formed, and a transformation (e.g., a fast Fourier transform) may be applied to the time series in order to determine the power spectral density 14. As is also shown in FIG. 1E, the power spectral density 14 depicts vibration powers as a function of frequency over the range of frequencies $f_1 \ldots f_n$, and natural frequencies $(f_N)_1$, $(f_N)_2$, $(f_N)_3$, $(f_N)_4$ of vibration of the aerial vehicle 110 may be located at frequencies corresponding to local or absolute maximum levels of power or energy. The power spectral density 14 may depict any number of natural frequencies of vibration of the aerial vehicle 110 at such peaks, e.g., four, such as is shown in FIG. 1E, or any other number of natural frequencies.

Figure 1F:
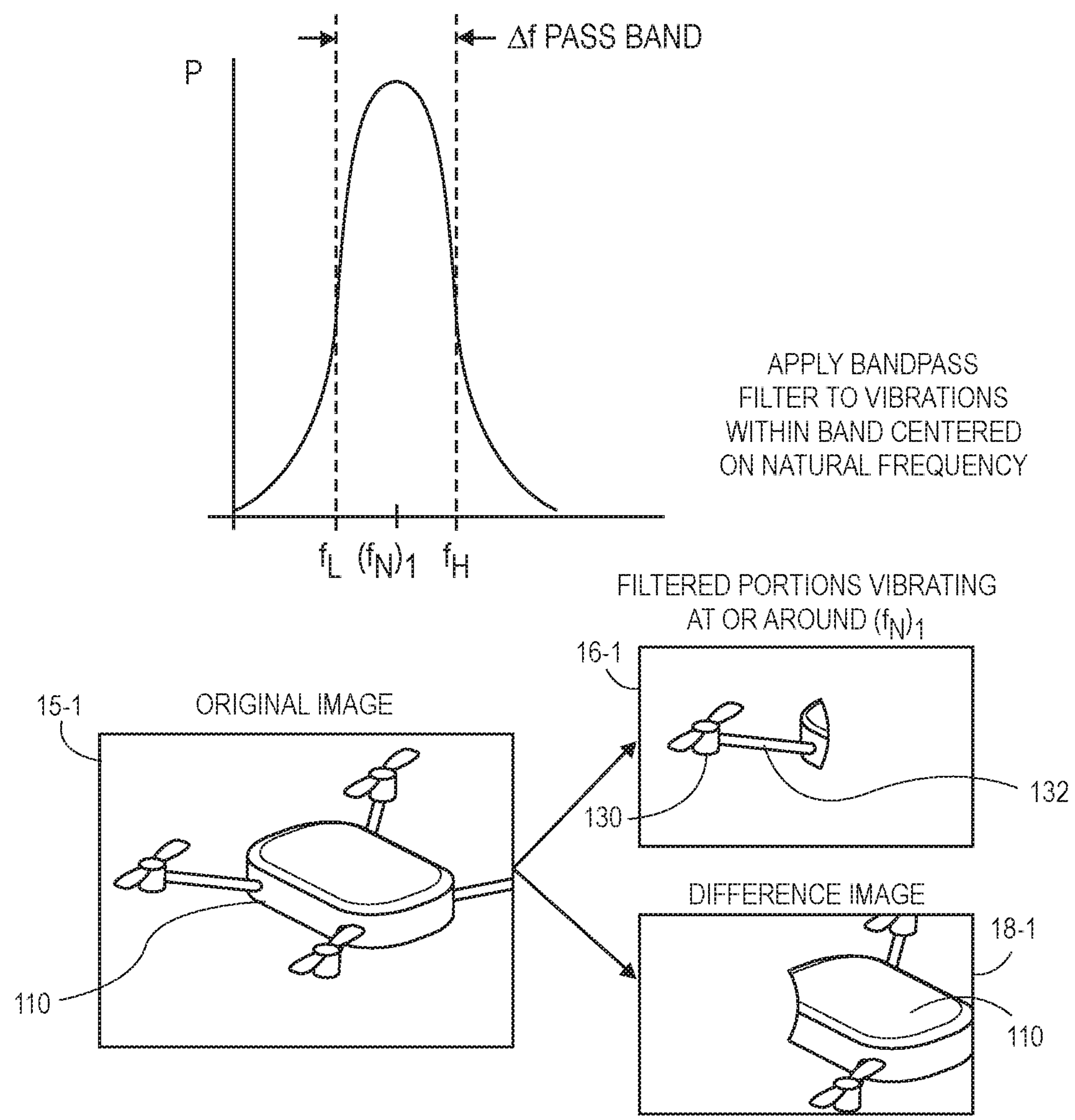
Figure 1G:
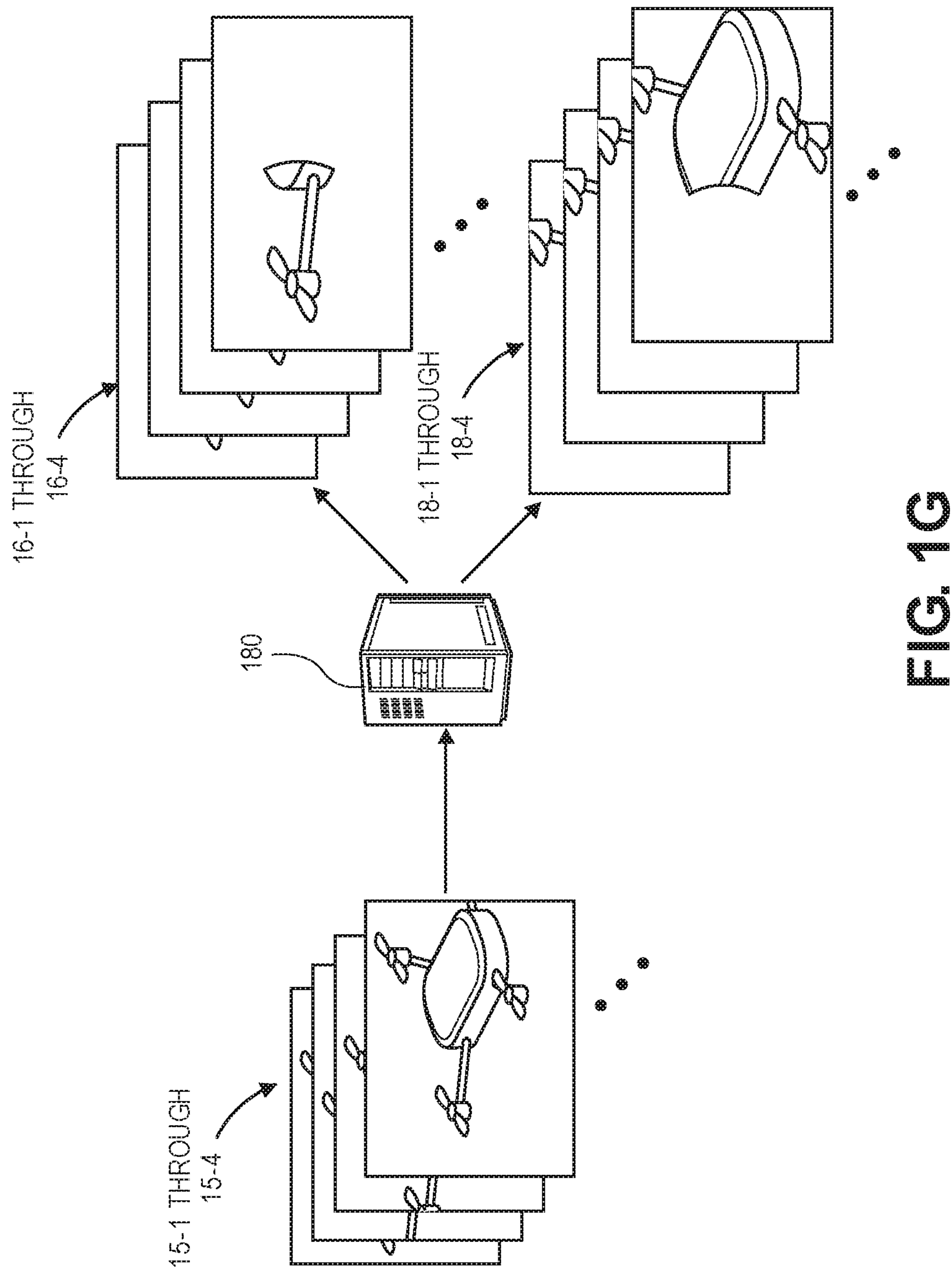

After the natural frequencies of vibration of an object, viz., the aerial vehicle 110, are determined, each of the images 15-1, 15-2, 15-3, 15-4 may be provided to a filter, such as a band-pass filter having a band centered on one of the natural frequencies of vibration, in order to consider only vibrations of the object within the band, or vibrations corresponding to one of the natural frequencies. Each of the images 15-1, 15-2, 15-3, 15-4 of the sequence is decomposed to determine sequences of amplitudes and phases of the vibration of the aerial vehicle 110. For example, as is shown in FIGS. 1F and 1G, each of the images 15-1, 15-2, 15-3, 15-4 is provided to a band-pass filter centered on a natural frequency $(f_N)_1$ in order to identify filtered portions 16-1, 16-2, 16-3, 16-4 of the respective images 15-1, 15-2, 15-3, 15-4 that depict vibrations of portions of the aerial vehicle 110, viz., one of the motors 130 and an extension 132 coupling the one of the motors 130 to the frame 115, at frequencies within a passband Δf, viz., at or around the natural frequency $(f_N)_1$, or above a low-pass frequency $f_L$ and below a high-pass frequency $f_H$. Additionally, filtering the images 15-1, 15-2, 15-3, 15-4 also results in the generation of a difference image 18-1, 18-2, 18-3, 18-4, each of which depicts a difference between one of the images 15-1, 15-2, 15-3, 15-4 and a corresponding one of the portions 16-1, 16-2, 16-3, 16-4 extracted therefrom. In some embodiments, the images 15-1, 15-2, 15-3, 15-4 may be provided first to a high-pass filter, and next to a low-pass filter, or vice versa, rather than providing the images 15-1, 15-2, 15-3, 15-4 to a band-pass filter.

Figure 1H:
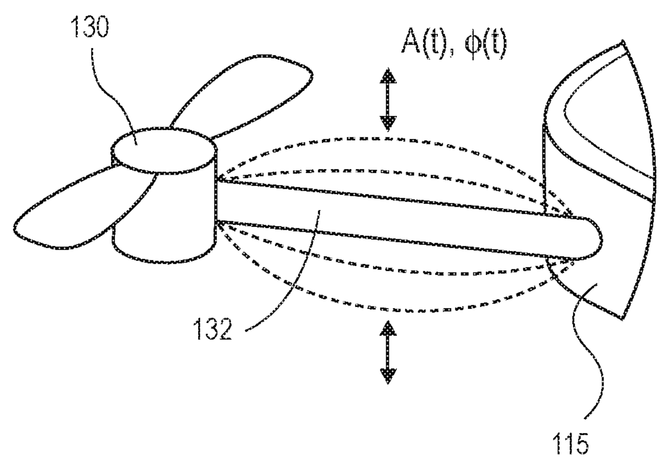

As is shown in FIG. 1H, amplitudes A(t) and phases ϕ(t) of vibration of the one of the motors 132 and the extension 132 of the aerial vehicle 110 in response to the excitation by acoustic energy from the acoustic speaker 170 may be determined from each of the portions 16-1, 16-2, 16-3, 16-4 filtered from the images 15-1, 15-2, 15-3, 15-4. For example, each of such portions 16-1, 16-2, 16-3, 16-4 may be provided to an optical flow algorithm, a matching algorithm, or any other algorithm that receives portions 16-1, 16-2, 16-3, 16-4 as inputs and determines horizontal and/or vertical disparities between pixels appearing within each of the images as outputs of the optical flow algorithm. Such outputs may include a disparity image, a displacement image or a parallax image indicating disparities, displacements and/or parallax between points appearing within each of the portions 16-1, 16-2, 16-3, 16-4. One or more algorithms may be further configured to determine the phases of vibration of the portions 16-1, 16-2, 16-3, 16-4 over time, e.g., based on the amplitudes or relative displacements of the portions 16-1, 16-2, 16-3, 16-4.

Figure 1I:
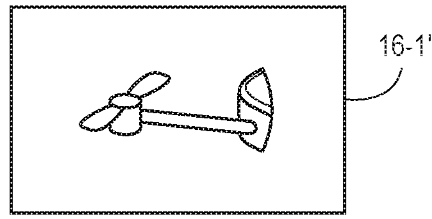
Figure 1I:
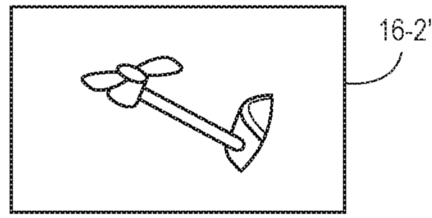
Figure 1I:
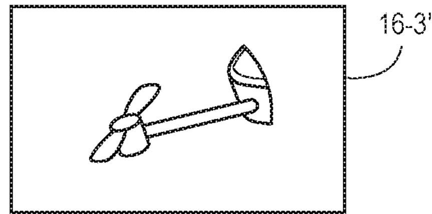
Figure 1I:
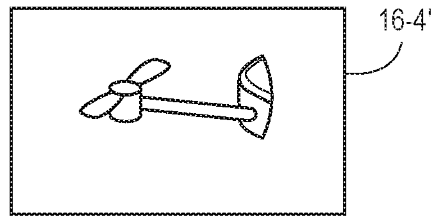

As is shown in FIG. 1I, each of the phases ϕ(t) determined from the portions 16-1, 16-2, 16-3, 16-4 may be multiplied by an amplification factor α, in order to synthetically exaggerate the vibration of aspects of the aerial vehicle 110 appearing within such portions 16-1, 16-2, 16-3, 16-4 over time. Multiplying each of the phases of the aspects of the aerial vehicle 110 over time by the amplification factor α thus results in new portions 16-1', 16-2', 16-3', 16-4' depicting the motion of such aspects in a magnified fashion.

Figure 1J:
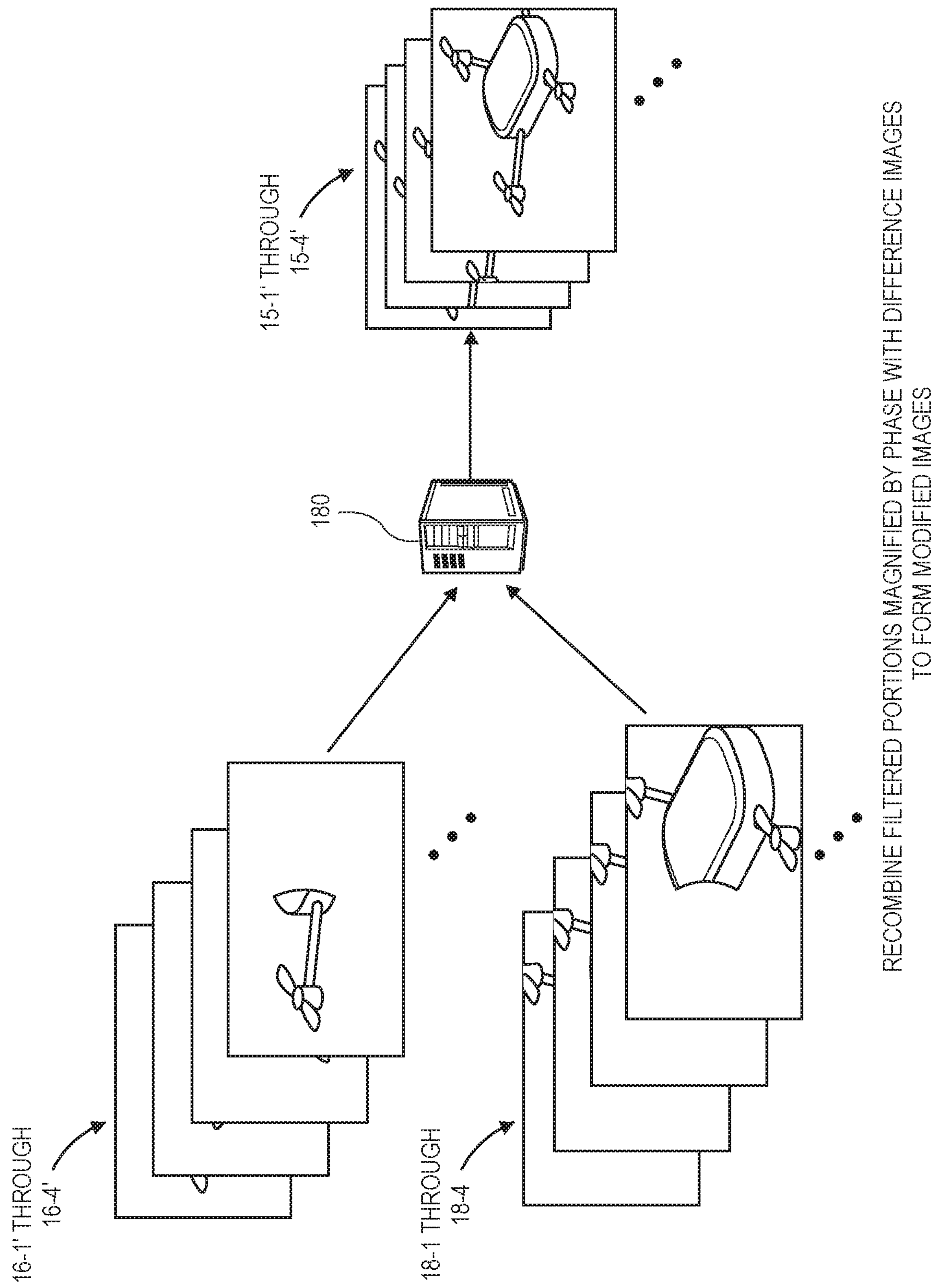
Figure 1K:
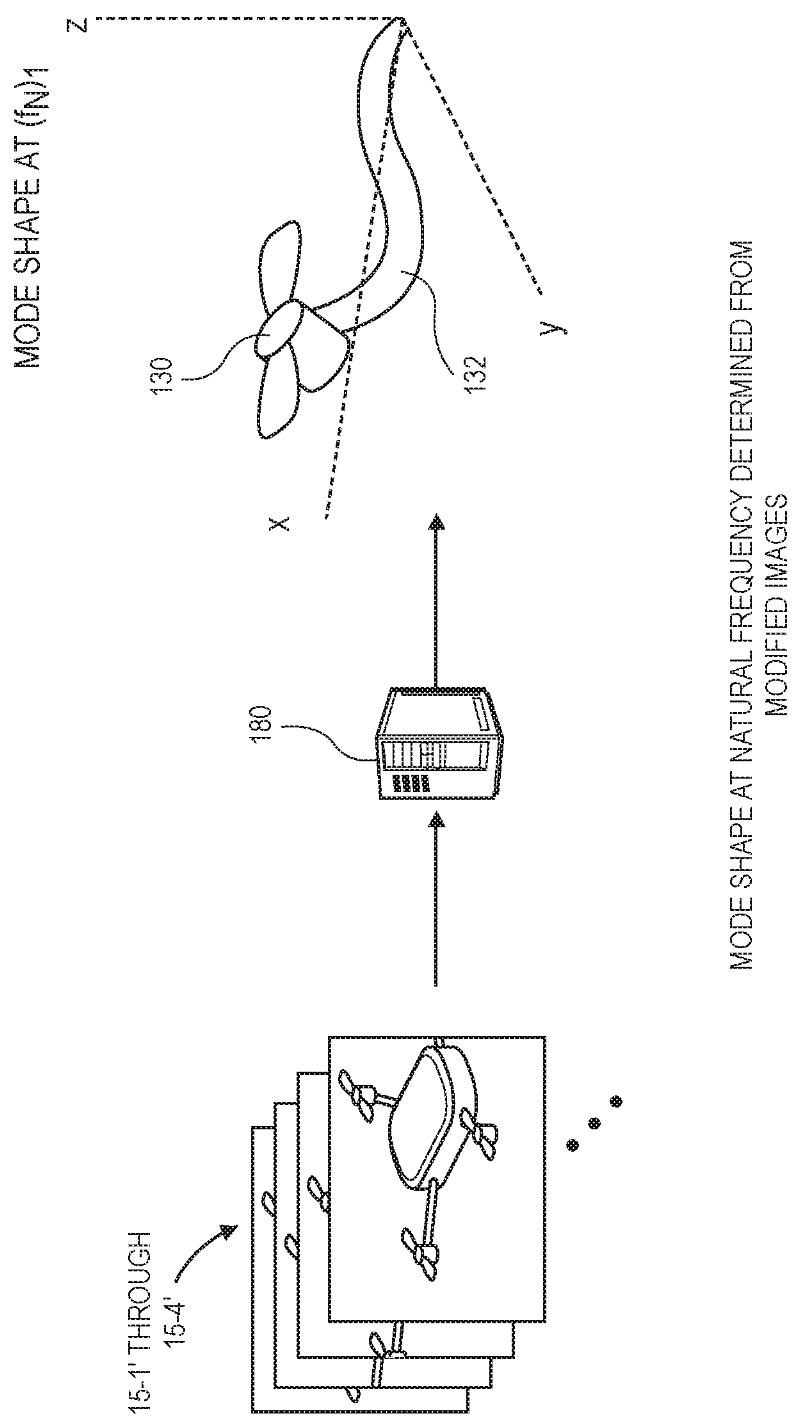

As is shown in FIG. 1J, a second plurality of images 15-1', 15-2', 15-3', 15-4' may be formed by synthetically recombining the magnified filtered portions 16-1', 16-2', 16-3', 16-4' of the images 15-1, 15-2, 15-3, 15-4 and the difference images 18-1, 18-2, 18-3, 18-4 which resulted from the filtering of the images 15-1, 15-2, 15-3-, 15-4 as shown in FIGS. 1F and 1G. As is shown in FIG. 1K, combining the plurality of images 15-1', 15-2', 15-3', 15-4' into a stream results in a visual tool that depicts, in a magnified fashion, the effects of vibration at the natural frequency $(f_N)_1$ on the aerial vehicle 110, e.g., on the motor 130 and the extension 132, from which a mode shape, or a spatial distribution or model of the behavior of the aerial vehicle 110 or portions thereof in the presence of vibration at the natural frequency $(f_N)_1$, may be generated. By amplifying the vibration of the aerial vehicle 110 based on the differences in phase, the vibration of the aerial vehicle 110 may be visibly perceived within the modified images 15-1', 15-2', 15-3', 15-4' to a greater extent than within the images 15-1, 15-2, 15-3, 15-4. In some embodiments, a time-series analysis may be performed on the modified images 15-1', 15-2', 15-3', 15-4', and a stream of the modified images 15-1', 15-2', 15-3', 15-4' may be used to determine the mode shape of the vibration of the aerial vehicle 110 at the natural frequency $(f_N)_1$.

Accordingly, in some embodiments, the systems and methods of the present disclosure may capture imaging data as an object (e.g., a vehicle, such as an unmanned aerial vehicle, or drone) is subject to excitation over a range of frequencies by an extrinsic or intrinsic source. One or more pixels of image planes that depict surfaces or other portions of interest of the object may be selected, and the intensities of the pixels across a plurality of images may be determined. A time series of the intensities of the pixels may be formed, and a fast Fourier transform or other transformation may be applied to the time series to generate a power spectral density plot or diagram depicting powers of vibration as functions of frequency. Additionally, each of the images may be processed by a band-pass filter applied across a band centered on a natural frequency of vibration to consider only the vibration at or around the natural frequency for amplification. The images may be processed to determine their respective amplitudes and phases of vibration, and a time series analysis applied to each of multiple images results in a modified image that magnifies the vibration or other motion based on phases of the vibration or motion. A plurality of the modified images may be combined into a stream in order to visually depict the vibration or motion in a magnified manner, or to determine a mode shape of the vibration or motion.

Aerial vehicles commonly radiate noise and/or other vibrations in response to thrust or lift forces, flow conditions, impacts or other adverse events. Such vibrations are typically exacerbated at natural frequencies, e.g., the natural vibrational modes, of the aerial vehicles. Determining such natural frequencies, or natural vibrational modes, is critical to maintaining the integrity of the aircraft, and in particular to avoid servo-elastic oscillations that may threaten the integrity of the aircraft or prevent the aircraft from recovering from subsequent oscillations.

In some embodiments, natural frequencies of vibration, or natural vibrational modes, of an object, such as one or more components or surfaces of aerial vehicles, may be determined by subjecting the object to excitation by an extrinsic or intrinsic source, and capturing imaging data from the object during the excitation. Natural frequencies of vibration or natural vibrational modes may be determined by analyzing differences in pixel intensities (e.g., blurring) across consecutive image frames. For example, in some embodiments, the object may be subjected to excitation over a range of frequencies, e.g., by an acoustic speaker, or by direct contact with the object. Imaging data may be captured during the excitation using a substantially high-speed camera or other imaging device, e.g., at or above frame rates of two thousand to four thousand frames per second (2,000 to 4,000 fps). One or more image pixels (or, simply, pixels) within the imaging data may be selected, and intensities (e.g., colors) of the image pixels across multiple images may be determined. Changes in the intensities of the selected image pixels may be processed to determine vibrations across the range of frequencies, and to identify the natural frequencies or natural vibrational modes of the object.

Vibrations of objects, such as one or more components or surfaces of aerial vehicles, may be detected in imaging data. For example, a plurality of digital images (e.g., a stream of video images) may be subjected to decomposition and filtering to reveal vibrations or other low-amplitude motion of objects that are subject to excitation. A time series of visual characteristics of the digital images of the stream, including colors or other values that are indicative of intensity of one or more pixels at any locations within the digital images may be considered, and changes in such values within one or more frequency bands may be amplified. One or more transformations, such as a fast Fourier transform, may be applied to a time series of the intensities to determine a power spectral density of the vibrations, and natural frequencies, or natural vibrational modes, may be identified as peaks in the power spectral density.

In some embodiments, after natural frequencies of vibration or natural vibrational modes are identified for an object, such as one or more components or surfaces of aerial vehicles, the imaging data may be further subjected to spatial and temporal processing to detect vibrations or other motion of the objects, even where such vibrations or motion are small in magnitude, and to determine mode shapes of the objects based on such vibrations or motion. For example, in some embodiments, vibrations or other motion of objects depicted within images captured as the objects are subjected to excitation may be amplified according to one or more phase-based video amplification algorithms, including but not limited to algorithms applying steerable pyramids over time. In some embodiments, steerable pyramids may decompose images and separate amplitudes of wavelets from their respective phases. Each of the images may be band-passed by a filter applied with a small frequency band around the respective natural frequencies of vibration or natural vibrational modes, and subjected to a time series analysis, from which vibration or other motion corresponding to such frequencies or modes is amplified. Moreover, where the amplified vibration or motion is visibly perceptible, the extent of the vibration or motion may be measured, and a mode shape in the form of a curve characterizing the extent to which such objects vibrate or move, or to identify portions of an object where impacts of such vibration or motion are observed to a maximum extent.

The systems and methods of the present disclosure provide a number of advantages over traditional systems or methods for detecting and evaluating vibration or other motion of objects. For example, many traditional systems or methods for detecting and evaluating vibration or other motion require attaching one or more sensors, such as accelerometers, to surfaces of the object. Such sensors may impact one or more properties or characteristics of vibration or other motion of the object, however, thereby rendering results obtained according to such systems or methods unreliable or impertinent. Some other systems and methods for detecting and evaluating vibration or other motion of objects involve the use of laser sources that are configured to emit beams having slightly different phases, and to analyze differences in phases between light emitted by such sources and light reflected from surfaces of the objects. Such systems and methods typically require specialized equipment or software that may be complex or costly in nature. The systems and methods of the present disclosure, meanwhile, operate without contact with the objects that are being evaluated, and are not destructive in nature.

In accordance with embodiments of the present disclosure, an object, such as an aerial vehicle or a component thereof, or any other object, may be subjected to excitation in any manner. For example, in some embodiments, acoustic energy generated by a speaker or another source of sound may be imparted upon the object across a range of frequencies, and at constant or varying intensities. Sound is kinetic energy released by vibration of molecules in a medium, such as air, and may be generated in any number of ways or in response to any number of events. For example, sound may be generated in response to vibrations resulting from impacts or frictional contact between two or more bodies, or in response to vibrations resulting from the rotation of one or more bodies such as shafts, e.g., by motors or other prime movers. Sound is also generated when motion or vibration of an object results in a pressure change in a medium, such as air, surrounding the object. For example, densities of the molecules of a medium within a vicinity of an object may be subjected to alternating periods of condensation and rarefaction, resulting in contractions and expansions of such molecules, and causing an issuance of a sound wave.

Alternatively, a vehicle or a component thereof, or any other object, may be subject to excitation of any kind, in addition to or as an alternative to sound. For example, in some embodiments, a vehicle or another object may be subject to excitation by a component that is affixed to a surface of the vehicle or object, and configured to generate vibrations at any selected frequency within a known, defined range. In some embodiments, an excitation source may be an intrinsic component of a vehicle or another object, such as where a vehicle includes a motor that may be controlled to impart vibrations upon the vehicle at any selected frequency within a known, defined range. Moreover, frequencies of excitation may cover any range, such as from zero hertz to five hundred hertz (0 to 500 Hz), from zero hertz to two thousand hertz (0 to 2000 Hz), or over any other ranges, or any other range.

In some embodiments, energy may be emitted by a speaker or another excitation source over a range of frequencies. For example, the energy may be imparted upon the object in a stepwise fashion, e.g., according to a step function, or according to a delta function or any other function, such that a frequency of the energy being emitted remains constant for a brief period of time before being increased or decreased to another frequency. As energy is imparted upon an object at a given frequency, an imaging device may be aligned to capture images of the object at substantially high frame rates. In some embodiments, the frame rates may be two thousand to four thousand frames per second (2,000 to 4,000 fps) or greater.

Images captured by an imaging device during excitation of an object, such as an aerial vehicle, may be processed to interpret colors or intensities of pixels corresponding to one or more aspects of the object. For example, in some embodiments, images captured by an imaging device may be processed according to any technique to determine intensities of pixels corresponding to aspects of an object depicted within the images. A power level, or an energy level, associated with the changes in intensities of the pixels may be determined for each of the frequencies of a range. Where the power level or the changes in intensity observed at a given frequency of excitation exceeds a predetermined threshold, or is significantly greater than power levels or changes in intensity at other frequencies, the given frequency is a natural frequency of vibration.

In some embodiments of the present disclosure, natural frequencies of vibration or natural vibrational modes may be accurately determined using imaging data with sufficiently low error rates, and for multiple natural vibrational modes, not simply for a first natural vibrational mode. Moreover, because a material stiffness (e.g., a Young's Modulus) of an object is proportional to a square of a natural frequency of vibration of the object, a material stiffness of the object may be visually determined where aspects of the geometry of the object such as a size, a cross-sectional area, or the like, are known. For example, where changes in intensity are determined for an object, and stiffness properties of the object are known, differences in amplitudes or phases of vibration in the presence of excitation at different locations of the object may be determined and associated with the stiffness properties.

Figure 2:
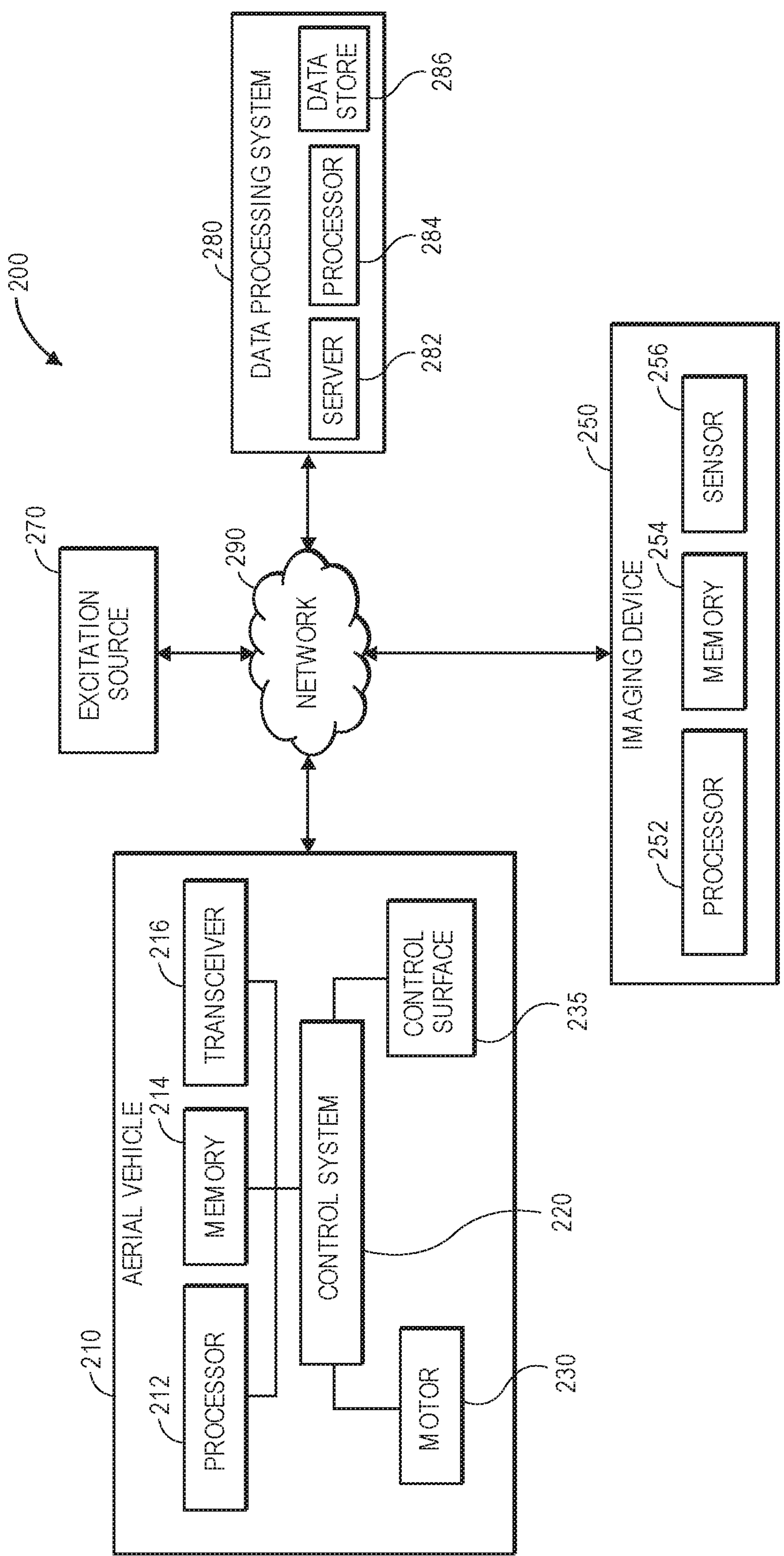
FIG. 2 is a block diagram of one system for visually determining vibrometric behavior of objects in accordance with embodiments of the present disclosure.

Referring to FIG. 2, a block diagram of components of one system 200 for visually determining vibrometric behavior of objects in accordance with embodiments of the present disclosure is shown. The system 200 of FIG. 2 includes an aerial vehicle 210, an imaging device 250, an excitation source 270 and a data processing system 280 connected to one another over a network 290. Except where otherwise noted, reference numerals preceded by the number "2" shown in the block diagram of FIG. 2 indicate components or features that are similar to components or features having reference numerals preceded by the number "1" shown in FIGS. 1A through 1K.

The aerial vehicle 210 includes a processor 212, a memory 214 and a transceiver 216. The aerial vehicle 210 further includes a control system 220, one or more propulsion motors 230, and one or more control surfaces 235.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 230 or the control surfaces 235.

The processor 212 may also control the operation of one or more control systems or modules, such as the control system 220, for generating instructions for conducting operations of one or more of the propulsion motors 230 or one or more of the control surfaces 235, or for interpreting information or data captured by one or more onboard sensors (not shown). Such control systems or modules may be associated with one or more other computing devices or machines, and may communicate with the imaging device 250, the excitation source 270, the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 230 or the control surfaces 235, or any other devices or components (not shown). The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 230 or the control surfaces 235, or other components, such as to cause one or more of the propulsion motors 230 to rotate propellers at desired speeds, or to cause such propellers to be aligned in selected positions or orientations. The control system 220 may further control any other aspects of the aerial vehicle 210, including but not limited to the operation of one or more aspects of the control surfaces 235 or other features within desired ranges or by desired distances or deflections, or the engagement with or release of one or more items by one or more engagement systems (not shown). In some embodiments, the control system 220 may be integrated with one or more of the processor 212, the memory 214 and/or the transceiver 216.

The propulsion motors 230 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 230 may be a brushless DC multi-phase motor such as an outrunner brushless motor or an inrunner brushless motor.

The aerial vehicle 210 may include any number of propulsion motors 230 of any kind. For example, one or more of the propulsion motors 230 may be aligned or configured to provide forces of lift to the aerial vehicle 210, exclusively, while one or more of the propulsion motors 230 may be aligned or configured to provide forces of thrust to the aerial vehicle 210, exclusively. Alternatively, one or more of the propulsion motors 230 may be aligned or configured to provide forces of lift and forces of thrust to the aerial vehicle 210, as needed. For example, the propulsion motors 230 may be fixed in their orientation on the aerial vehicle 210, or configured to vary their respective orientations, e.g., a tilt-rotor aircraft. Moreover, the propulsion motors 230 may be aligned or configured to operate with different capacities or ratings, or at different speeds, or coupled to propellers having different sizes and shapes. For example, in some embodiments, one or more of the propulsion motors 230 may be an electric motor, e.g., a brushless DC multi-phase motor, and one or more of the propulsion motors 230 may be a gasoline-powered motor.

Each of the propulsion motors 230 may be coupled to one or more propellers (or rotors or rotatable systems) having a plurality of shaped blades joined to a hub or boss. For example, each of such propellers may be rotatably mounted to a mast or shaft associated with a respective one of the propulsion motors 230 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The control surfaces 235 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 235 may include, but are not limited to, ailerons, brakes, elevators, elevons, flaps, rudders, slats, tailerons or wings, or other features. In some embodiments, each of the control surfaces 235 may include a motor, such as an electrical, mechanical and/or hydraulic or other component or actuator for rotating, translating or otherwise repositioning or reorienting a respective one of the control surfaces 235 during operation of the aerial vehicle 210, under the control of the one or more processors 212 or the control system 220. In some embodiments, each of the control surfaces 235 may include a directional sensor, such as any type of sensor or other component that is embedded into one or more aspects of one of the control surfaces 235 (e.g., a leading edge, a trailing edge, a tip or one or more other faces or aspects of such surfaces 235) and configured to gather information or data with respect to an alignment or orientation thereof. For example, one of the control surfaces 235 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction. The aerial vehicle 210 may further include any number of additional fixed or mobile components or features, including but not limited to actuators, brackets, fuselages, junctions, landing gear, struts, or other components or features, which may be mounted to component parts of a frame, or to one or more component parts mounted to the frame.

Although the block diagram of FIG. 2 includes a single box for a propulsion motor 230 and a single box for a control surface 235, those of ordinary skill in the pertinent arts will recognize that any number or type of propulsion motors and/or control surfaces may be provided aboard the aerial vehicle 210 in accordance with the present disclosure.

The imaging device 250 may be any form of optical recording device that may be used to photograph or otherwise record imaging data of aerial vehicles, or for any other purpose, such as a digital camera, a range camera, a depth camera, an infrared camera, a radiographic camera, or the like. The imaging device 250 may include one or more processors 252, memory or storage components 254 and image sensors 256, as well as one or more photosensitive surfaces, filters, chips, electrodes, clocks, boards, timers or any other relevant features (not shown). The imaging device 250 may capture imaging data in the form of one or more still or moving images of any kind or form, as well as any relevant audio signals or other information, and may be connected to the aerial vehicle 210, the excitation source 270 and/or the data processing system 280 by way of the network 290.

Moreover, the imaging device 250 may also include manual or automatic features for modifying a position, field of view or orientation of the imaging device 250. For example, a digital camera may be configured in a fixed position, or with a fixed focal length (e.g., fixed-focus lenses) or angular orientation. Alternatively, the imaging device 250 may include one or more actuated or motorized features for adjusting a position of the imaging device 250, or for adjusting either the focal length (e.g., zooming the imaging device 250) or the angular orientation (e.g., the roll angle, the pitch angle or the yaw angle), by causing a change in the distance between the sensor and the lens (e.g., optical zoom lenses or digital zoom lenses), a change in the location of the imaging device 250, or a change in one or more of the angles defining the angular orientation.

For example, the imaging device 250 may be hard-mounted to a support or mounting that maintains the device in a fixed configuration or angle with respect to one, two or three axes. Alternatively, however, the imaging device 250 may be provided with one or more motors and/or controllers for manually or automatically operating one or more of the components, or for reorienting a position, axis or direction of the imaging device 250, i.e., by moving, panning or tilting the imaging device 250. Panning the imaging device 250 may cause a rotation within a horizontal plane or about a vertical axis (e.g., a yaw), while tilting the imaging device 250 may cause a rotation within a vertical plane or about a horizontal axis (e.g., a pitch). Additionally, the imaging device 250 may be rolled, or rotated about its axis of rotation, and within a plane that is perpendicular to the axis of rotation and substantially parallel to a field of view of the imaging device 250. The imaging device 250 may also be provided on a vehicle enabled to pass within an operating range of the aerial vehicle 210.

The imaging device 250 may also digitally or electronically adjust an image identified in a field of view, subject to one or more physical and operational constraints. For example, the imaging device 250 may virtually stretch or condense the pixels of an image in order to focus or broaden the field of view of the imaging device 250, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

The excitation source 270 may be any device or system configured to impart energy (e.g., sound energy) over a range of frequencies onto one or more objects, such as the aerial vehicle 210, within a field of view of the imaging device 250. For example, the excitation source 270 may be any type or form of speaker or like system having one or more transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters. Alternatively, in some embodiments, the excitation source 270 may be any other system or component for imparting vibration energy onto one or more surfaces of an object, such as the propulsion motors 230, the control surfaces 235 or any other aspects of the aerial vehicle 210, e.g., by direct contact with the object or in any other manner. Moreover, in some embodiments, the excitation source 270 may be an intrinsic component of the aerial vehicle 210, such as one or more of the propulsion motors 230. The excitation source 270 may further include any number of processors or other components for communicating with one or more of the aerial vehicle 210, the imaging device 250 and/or the data processing system 280 over the network 290, as well as any number of power supplies of any type or form.

The data processing system 280 includes one or more physical computer servers 282 having one or more computer processors 284 and one or more data stores 286 associated therewith, and may be provided for any specific or general purpose. For example, the data processing system 280 of FIG. 2 may be independently provided for the exclusive purpose of receiving, analyzing or storing information or data received from the aerial vehicle 210, the imaging device 250 or the excitation source 270, including but not limited to imaging data or other sets of data regarding natural frequencies of vibration. Alternatively, the data processing system 280 of FIG. 2 may be provided in connection with one or more physical or virtual services configured to receive, analyze or store such information or data, as well as one or more other functions.

In some embodiments, the data processing system 280 may be configured to program one or more excitation sources 270 to emit energy (e.g., acoustic energy, or sound) at any intensity and over a range of frequencies. For example, the data processing system 280 may program the one or more excitation sources 270 to emit energy in a linearly increasing manner, e.g., in a stepwise fashion, such that the frequency of the energy being emitted remains constant for a brief period of time before being increased or decreased to another frequency. In some embodiments, the data processing system 280 may program one or more imaging devices 250 to capture images of an object being subject to excitation at substantially high frame rates, e.g., at or above frame rates of two thousand to four thousand frames per second (2,000 to 4,000 fps). In some embodiments, the data processing system 280 may be configured to receive images from the one or more imaging devices 250 and process the images to detect low levels of vibration or other motion of such objects within the images. In still other embodiments, the data processing system 280 may be configured to associate power levels or energy levels of vibration with frequencies of excitation, or to identify one or more natural frequencies of vibration on any basis.

The servers 282 may be connected to or otherwise communicate with the processors 284 and the data stores 286. The data stores 286 may store any type of information or data, including but not limited to information or data received from the aerial vehicle 210, the imaging device 250 or the excitation source 270, for any purpose. The servers 282 and/or the computer processors 284 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

Any of the functions or processed described herein as being performed, or capable of being performed, by one of the processor 212, the processor 252 or the server 282 may, in accordance with one or more embodiments disclosed herein, be performed by any or all of the processor 212, the processor 252 or the server 282. For example, the programming or operation of the excitation source 270 to excite an object, or the imaging device 250 to capture imaging data described herein may be configured or controlled by any or all of the processor 212, the processor 252 or the server 282. Likewise, the selection of image pixels within image planes of the imaging device 250, the determination of intensities of such image pixels within imaging data, the generation of time series from such intensities, the transformation of such intensities or time series, the generation of power spectral densities, the identification of natural frequencies, the filtering of imaging data, the determination of amplitudes or phases of vibration or other motion, the amplification of phases or the generation of modified video images described herein may be performed by any or all of the processor 212, the processor 252 or the server 282. Finally, the determination of mode shapes for one or more objects may also be made by any or all of the processor 212, the processor 252 or the server 282.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the imaging device 250, the excitation source 270 or the data processing system 280 may use any web-enabled or Internet applications or features, or any other client-server applications or features including E-mail or other messaging techniques, to connect to the network 290, or to communicate with one another. For example, the aerial vehicle 210 and/or the imaging device 250 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the imaging device 250, the excitation source 270 or the data processing system 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 252 or the processor 284, or any other computers or control systems utilized by the aerial vehicle 210, the imaging device 250, the excitation source 270 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
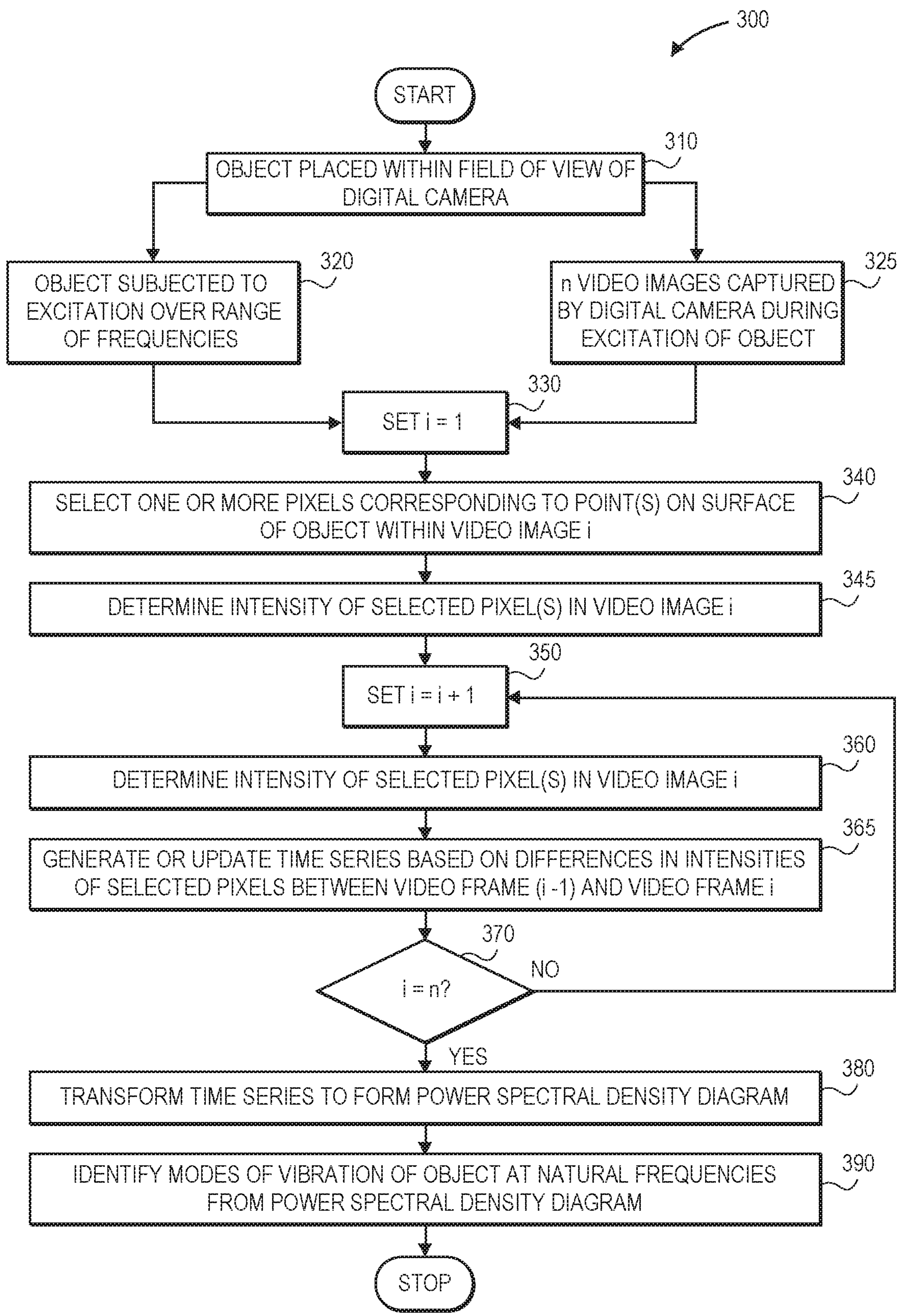
FIG. 3 is a flow chart of one process for visually determining vibrometric behavior of objects in accordance with embodiments of the present disclosure.

As is discussed above, natural frequencies of vibration or natural vibrational modes may be determined for an object based on imaging data captured as the object is subjected to extrinsic or intrinsic excitation. Referring to FIG. 3, a flow chart 300 of one process for visually determining vibrometric behavior of objects in accordance with embodiments of the present disclosure is shown. At box 310, a digital camera is aligned to include one or more aspects of an object within a field of view. For example, in some embodiments, the digital camera may include an object such as a vehicle in its entirety within a field of view. Moreover, the object may be any type or form of vehicle including but not limited to an aerial vehicle (e.g., an unmanned aerial vehicle, or drone), an autonomous ground vehicle or robot, an automobile, or any other powered or human-powered vehicle. Alternatively, in some embodiments, the digital camera may be aligned to include a portion of a vehicle, such as a specific propulsion motor, control surface or other component that may be attached or configured for attachment to any type or form of vehicle, within a field of view. In still other embodiments, a digital camera may be aligned to include one or more aspects of any type of object within a field of view, and the object need not be a vehicle or component thereof.

At box 320, the vehicle is subjected to excitation over a range of frequencies, e.g., by an excitation source. For example, the excitation source may be an acoustic speaker or other system configured to project acoustic energy at constant or varying intensities over a range of frequencies. In some embodiments, a frequency of the acoustic energy may be linearly or sequentially increased over time over a defined range of frequencies, such as from zero hertz to five hundred hertz (0 to 500 Hz), from zero hertz to two thousand hertz (0 to 2000 Hz), or over any other ranges of frequencies, according to a step function or a delta function, or in any other manner. In some other embodiments, however, the excitation source may be any other component configured to excite the vehicle, such as by direct contact with the vehicle, e.g., a vibration source adhered or affixed to one or more surfaces of the vehicle, or an object that strikes the vehicle in one or more locations. For example, in some embodiments, the excitation source may be a machine such as a motor or other system that may be selectively programmed to generate vibrations or other motion over the range of frequencies. In parallel with the excitation, at box 325, n video images or other imaging data are captured by the digital camera, e.g., during the excitation over the range of frequencies at box 320. For example, in some embodiments, the digital camera may be configured to capture images at or above frame rates of two thousand to four thousand frames per second (2,000 to 4,000 fps), or at any other frame rate.

At box 330, a value of a step variable i is set to equal one, or i=1. At box 340, one or more pixels within a video image i that correspond to points on at least one surface of the object are selected. In some embodiments, the selected pixels may include or be parts of uniquely visible textures, patterns, surfaces or markings on the at least one surface, or may be identified as a function of a level of lighting within the field of view of the digital camera, a measure of surface reflectance in one or more locations on surfaces of the object, or based on any other factor. In some embodiments, a single pixel may be selected. In some other embodiments, multiple pixels may be selected, and such pixels may include a cluster of pixels in or around a single location on surfaces of the object, or in different locations on surfaces of the object.

At box 345, the intensities of the selected pixels in a video image i are determined. For example, the intensities are the values of the selected pixels in the video image i, e.g., a value within a range of 0 (or black) to 255 (or white) for an eight-bit grayscale image, or values of one or more channels, such as a red channel, a green channel or a blue channel of a color (or "RGB") image. The intensities of the selected pixels within the video image i may be determined in any manner. In some embodiments, the intensities of the selected pixels may be determined as the object is subjected to the excitation over the range of frequencies, such that intensities are determined in real time or in near-real time. In some other embodiments, such as where the imaging data is time-stamped or otherwise marked or designated to correspond with given frequencies, the intensities of the selected pixels may be determined at a later time, e.g., after the vehicle has been subjected to the excitation.

At box 350, the value of the step variable i is incremented by one, or i=i+1, and at box 360, the intensities of the pixels selected at box 340 within the video image i are determined.

At box 365, a time series is generated based on the differences in intensities of the selected pixels in the video image i and the video image (i−1), viz., the immediately preceding video image. The time series may represent the intensities separated by a difference in time between the capture of the video image i and the video image (i−1), e.g., a reciprocal of the frame rate. For example, in some embodiments, where the n video images are captured by a high-speed digital camera having a frame rate of approximately four thousand frames per second (or 4,000 fps), the intensities may be separated in the time series by approximately one quarter millisecond (or 0.25 ms). The time series may take any form, including but not limited to an array having any dimensions, including but not limited to a dimension corresponding to a number of the selected pixels and a dimension corresponding to a number, viz., i, up to n, of the video images.

At box 370, whether the value of the step variable i is equal to n is determined. If the value of the step variable i is not equal to n, then the process returns to box 350, where the value of the step variable i is further incremented by one, or i=i+1, before advancing to box 360, where an intensity of the pixels selected at box 340 within the video image i are determined, and to box 365, where the time series is updated based on the differences in the intensities of the selected pixels in the video image i and the video image (i−1).

If the value of the step variable i is equal to n, however, then intensities of the selected pixels have been determined, and the time series has been updated based on each of the n video images captured during the excitation of the object at box 325. The process then advances to box 380, where the time series is transformed to form a power spectral density diagram. For example, a diagram of the power spectral density may represent power associated with the vibration of the object over a range of frequencies as a function of frequency. The time series may be transformed in any manner to determine the power spectral density, or to form the power spectral density diagram, such as by applying a fast Fourier transform to the time series.

At box 390, the modes of vibration of the object at natural frequencies are identified from the power spectral density diagram, and the process ends. For example, one or more absolute or local maximum power levels or energy levels represented in the power spectral density diagram generated at box 380 correspond to natural frequencies of vibration or natural vibrational modes. Such modes or natural frequencies may be determined, therefore, based on the absolute or local maximum power levels or energy levels represented in the power spectral density diagram.

Figure 4A:
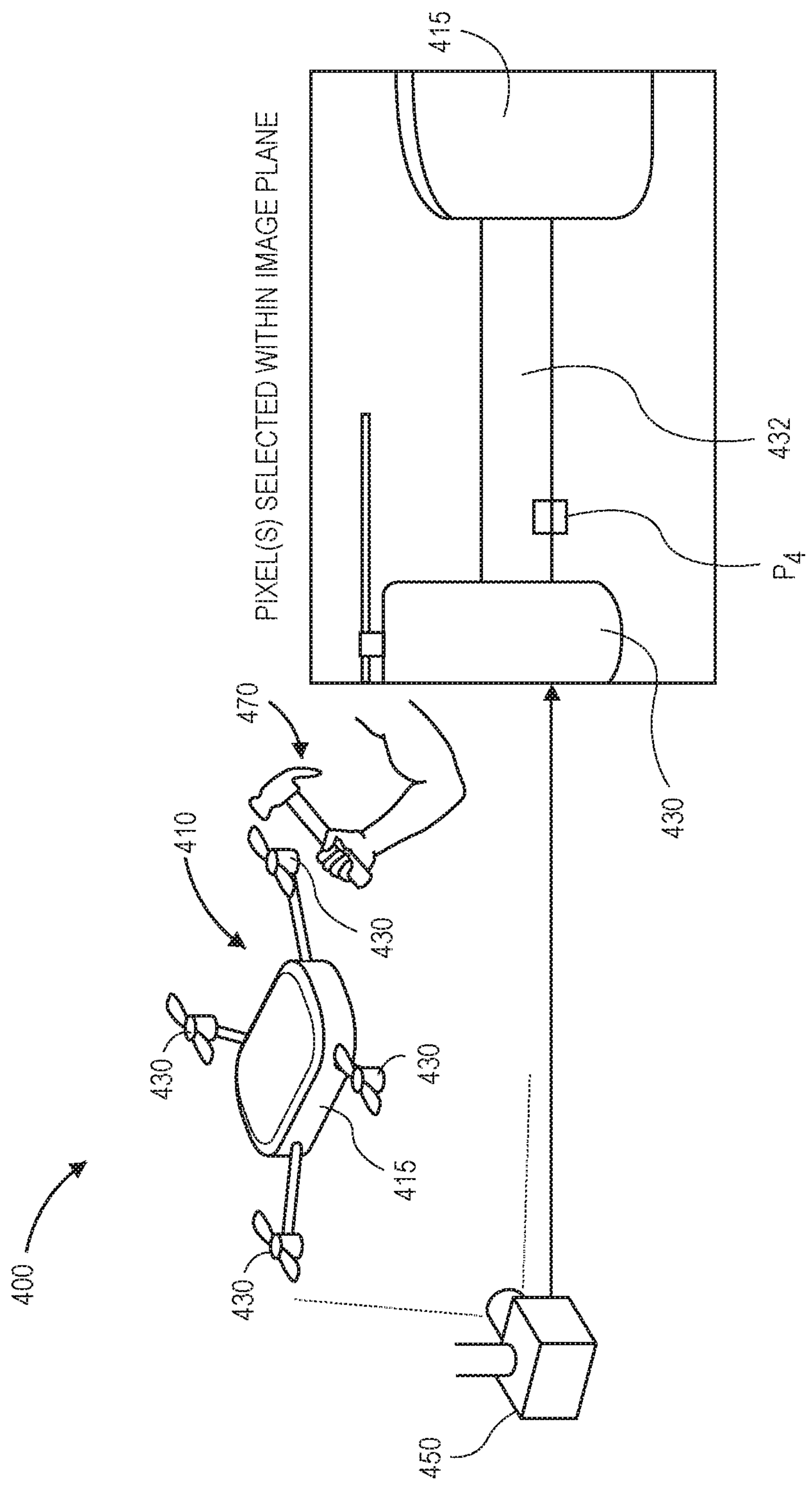
FIGS. 4A through 4C are views of aspects of one system for visually determining vibrometric behavior of objects in accordance with embodiments of the present disclosure.
Figure 4B:
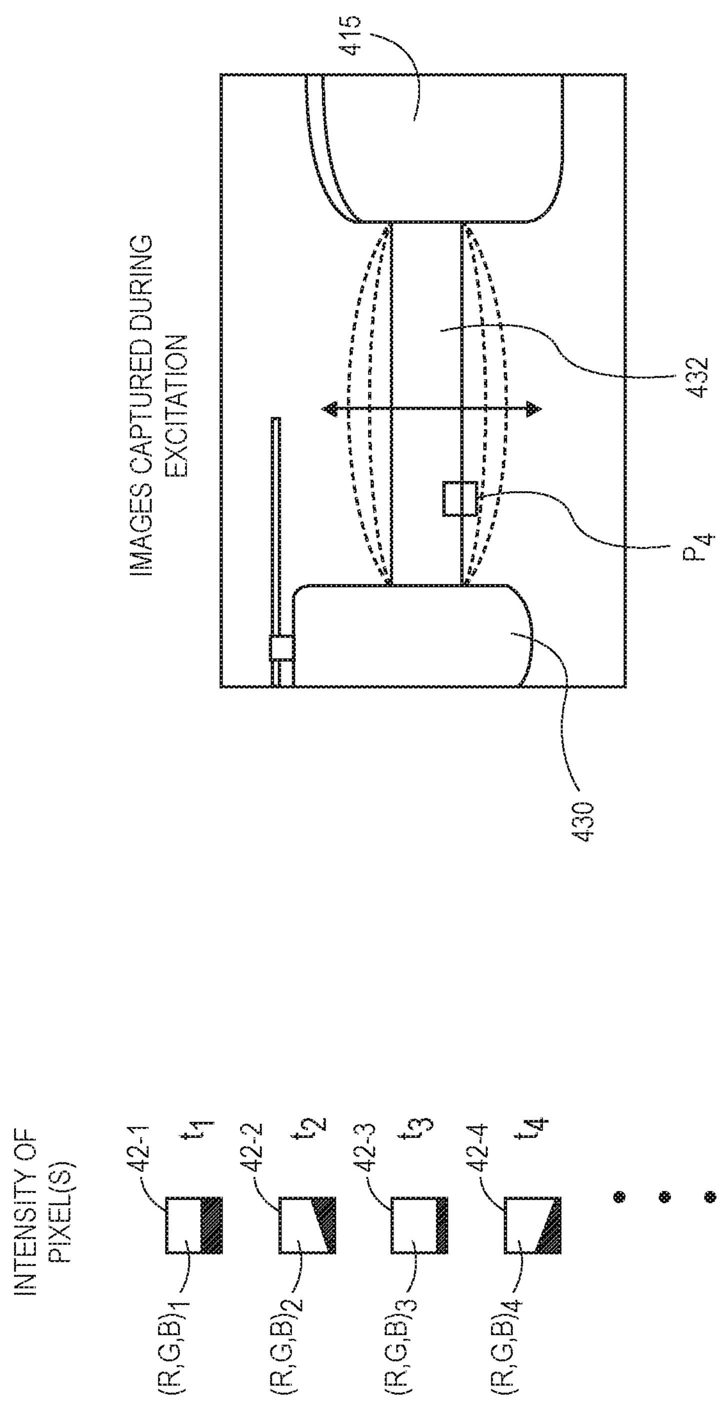
Figure 4C:
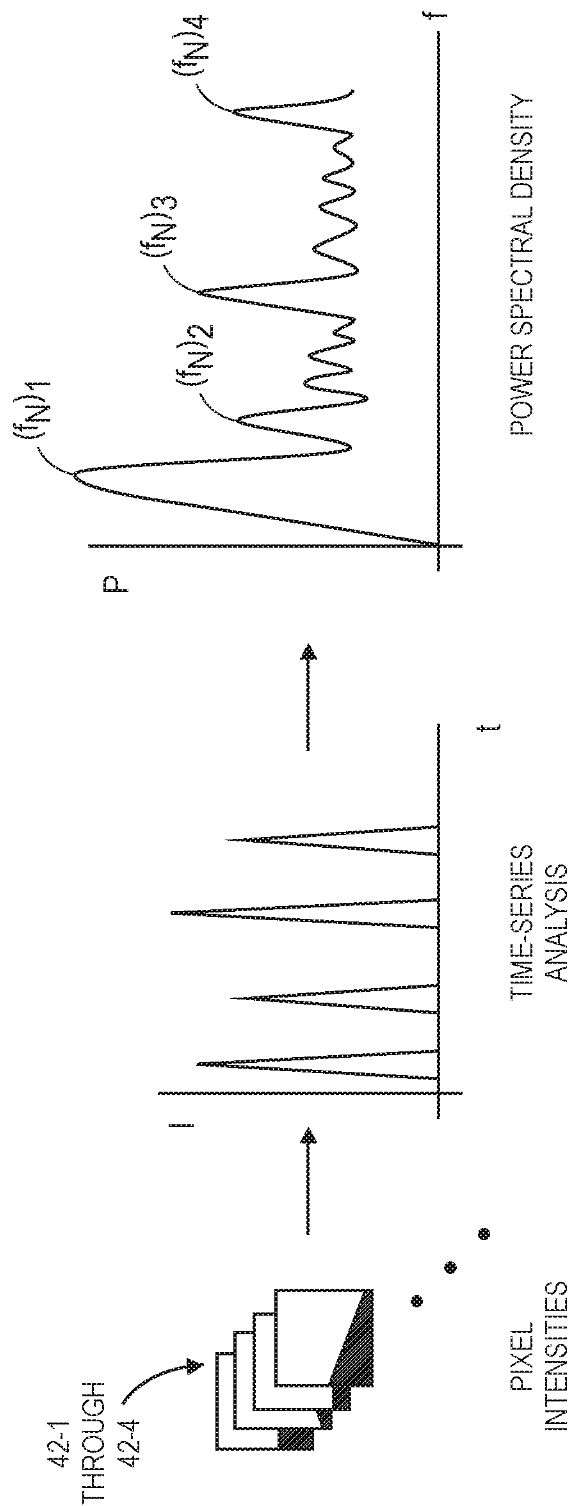

As is discussed above, one or more of the embodiments disclosed herein may be used to determine vibrometric behavior of portions of objects, or of objects as a whole, based on images captured of the objects as the objects are subjected to excitation. Referring to FIGS. 4A through 4C, views of aspects of one system 400 for visually determining vibrometric behavior of objects in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1K.

As is shown in FIG. 4A, the system 400 includes an aerial vehicle 410, an imaging device 450 and a manual excitation source 470. The aerial vehicle 410 includes a frame 415 having a plurality of motors 430 and a plurality of extensions 432. Each of the extensions 432 has a proximal end coupled to the frame 415 and a distal end coupled to one of the motors 430. The imaging device 450 is aligned to include at least one of the motors 430 and at least one of the extensions 432 within a field of view. The excitation source 470 may be a hammer, a mallet or another tool for imparting excitation in the form of vibrations at one or more frequencies and at any level of intensity, upon one or more portions of the aerial vehicle 410. In some embodiments, the excitation source 470 may be replaced or supplemented with any other type or form of extrinsic excitation source, e.g., an acoustic speaker, that may excite the aerial vehicle 410 at known, selected frequencies with the aerial vehicle 410 within a field of view of the imaging device 450. Alternatively, in some embodiments, the aerial vehicle 410 may be subject to excitation by one or more intrinsic sources, including but not limited to operations of one or more of the motors 430.

As is discussed above, the vibrometric behavior of an object may be determined by selecting pixels of an image plane of a digital camera or other imaging device, with such pixels corresponding to portions of an object (e.g., a vehicle, such as an aerial vehicle) within a field of view of the imaging device. As is further shown in FIG. 4A, a set of pixels $P_4$ within an image plane corresponding to one of the extensions 432 between the airframe 415 and one of the motors 430 is selected. The pixels of the set $P_4$ may be selected on any basis. For example, in some embodiments, the set of pixels $P_4$ may correspond to a specific portion of the aerial vehicle 410 for which information or data regarding vibrometric behavior is desired. Alternatively, the set of pixels $P_4$ may be selected to obtain a general representation of the vibrometric behavior of the aerial vehicle 410. Furthermore, the set of pixels $P_4$ may be clustered in a single location, such as is shown in FIG. 4A, or distributed at different locations on different surfaces of the aerial vehicle 410.

As is shown in FIG. 4B, intensities of the pixels $P_4$ may be determined from images captured by the imaging device 450 during the excitation of the aerial vehicle 410. For example, where a plurality of video images are captured from the imaging device 410 at times $t_1$, $t_2$, $t_3$, $t_4$, intensities 42-1, 42-2, 42-3, 42-4 of the set of pixels $P_4$ may be determined as values of each of three eight-bit channels for red, green and blue colors of a 24-bit digital image having ranges from 0 to 255, or $(R, G, B)_1$, $(R, G, B)_2$, $(R, G, B)_3$, $(R, G, B)_4$ for each of the pixels of the set $P_4$. Alternatively, where the imaging device 450 is configured to capture grayscale images, the intensities 42-1, 42-2, 42-3, 42-4 may have values of intensities of a single channel, e.g., an eight-bit channel ranging from 0 to 255. An intensity may be represented with any number of values, and such values may be within any range, in accordance with the present disclosure.

Moreover, because the aerial vehicle 410 is subject to excitation, the intensities 42-1, 42-2, 42-3, 42-4 of the set of pixels $P_4$ will have varying values over time. For example, due to the vibration of the aerial vehicle 410 caused by the excitation, a portion of surface of the aerial vehicle 410 depicted within the set of pixels $P_4$ will appear differently from image to image, in a repeated or oscillating manner. Therefore, differences in the intensities of the set of pixels $P_4$ appearing within such images will be proportional to the differences in amplitudes of the vibration of the aerial vehicle 410 at a location corresponding to the set of pixels $P_4$.

As is shown in FIG. 4C, a time series may be formed from the intensities 42-1, 42-2, 42-3, 42-4 of the set of pixels $P_4$, and a power spectral density diagram may be generated by transforming the time series, e.g., by applying a fast Fourier transform or other transformation to the time series. The power spectral density represents powers associated with the vibration of the object over a range of frequencies, e.g., as a function of frequency, and values of natural frequencies $(f_N)_1$, $(f_N)_2$, $(f_N)_3$, $(f_N)_4$ of excitation are observed at local or absolute maximum levels of power or energy within the power spectral density. Although the power spectral density of FIG. 4C depicts four natural frequencies, a power spectral density may depict any number of natural frequencies in accordance with the present disclosure.

As is discussed above, vibration or other motion of objects, such as one or more surfaces or components of an aerial vehicle, may be detected within imaging data by filtering video images with respect to the natural frequencies of vibration or the natural vibrational modes of the objects, and magnifying the vibration or other motion of the objects at or around such frequencies or modes. A time series analysis may be performed on the video images, which may be combined into a video stream, and amplitudes of the vibration or other motion of the objects at or around such frequencies or modes may be determined from the video stream.

Figure 5A:
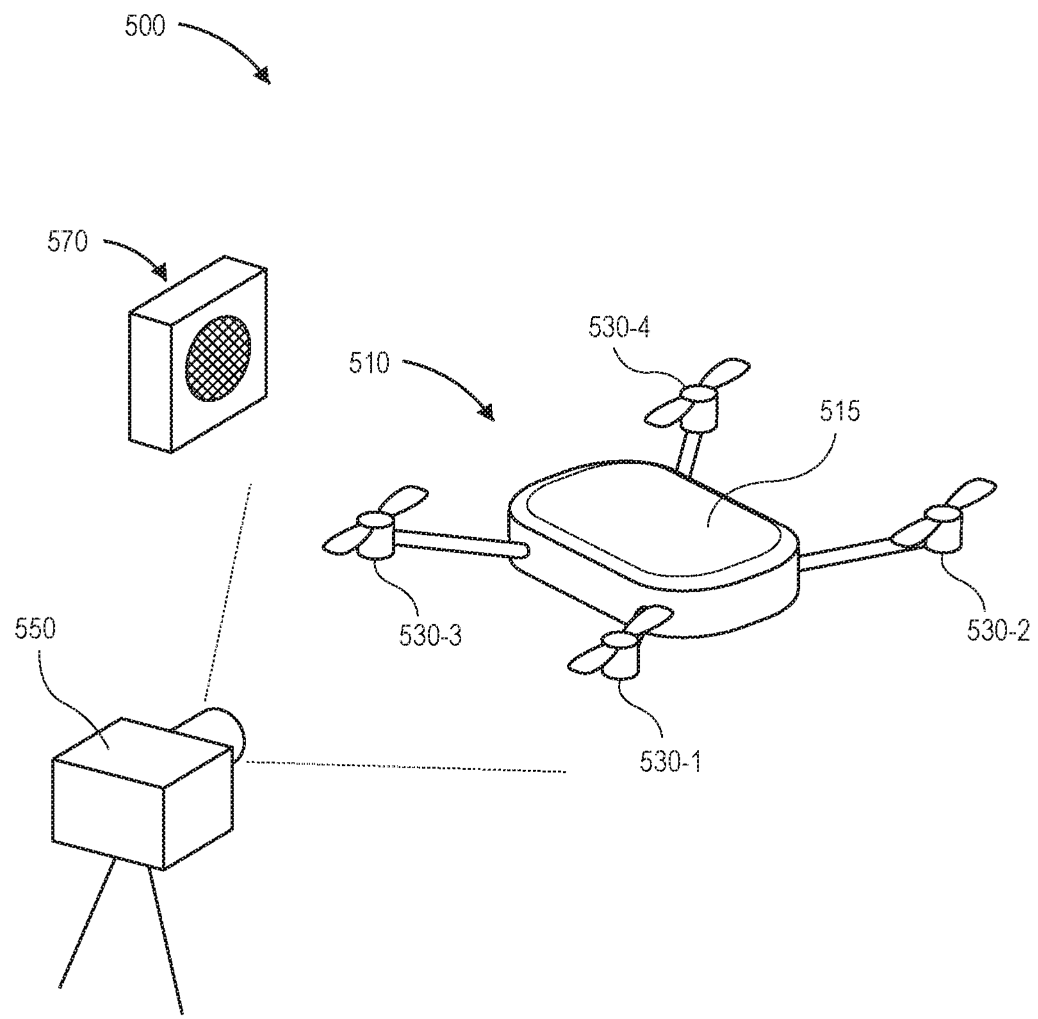
FIGS. 5A through 5C are views of aspects of one system for visually determining vibrometric behavior of objects in accordance with embodiments of the present disclosure.
Figure 5B:
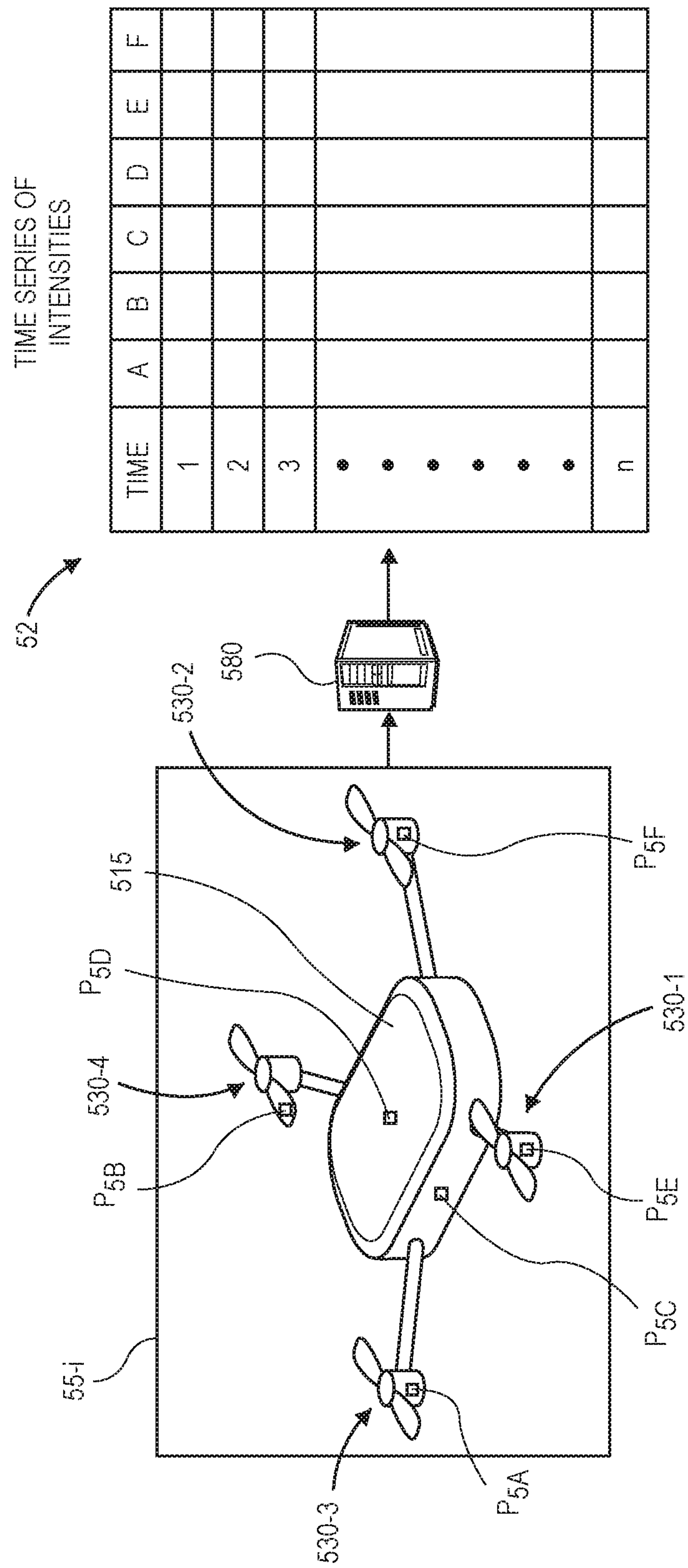
Figure 5C:
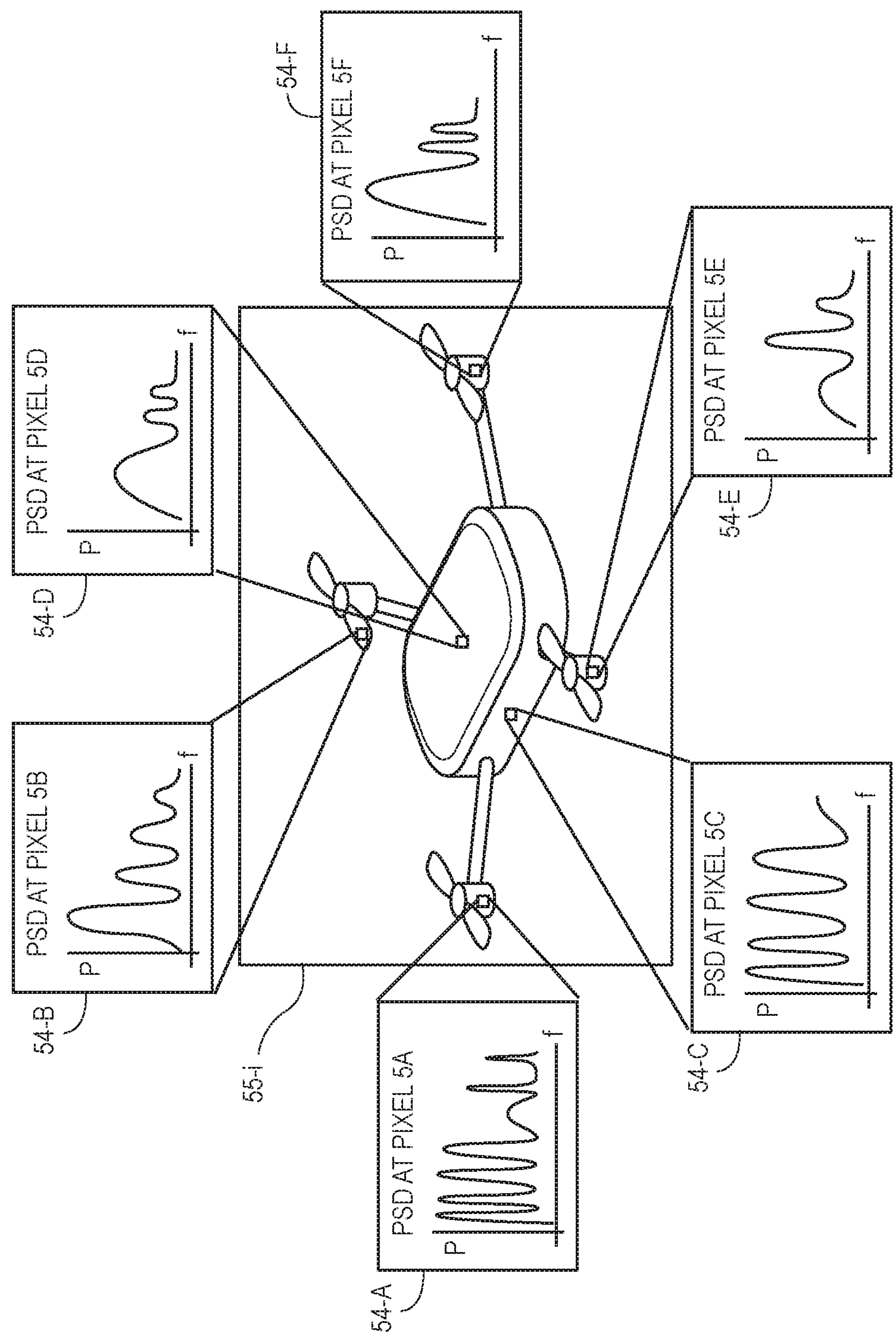

As is discussed above, pixels of an image plane of an imaging device may be selected to correspond with portions of an object within a field of view of the imaging device on any basis. Referring to FIGS. 5A through 5C, views of aspects of one system 500 for visually determining vibrometric behavior of objects in accordance with embodiments of the present disclosure are shown. Except where otherwise noted, reference numerals preceded by the number "5" shown in FIGS. 5A through 5C indicate components or features that are similar to components or features having reference numerals preceded by the number "4" shown in FIGS. 4A through 4C, by the number "2" shown in FIG. 2 or by the number "1" shown in FIGS. 1A through 1K.

As is shown in FIG. 5A, the system 500 includes an aerial vehicle 510, an imaging device 550 and an excitation source 570. The aerial vehicle 510 includes a frame 515 having a plurality of motors 530-1, 530-2, 530-3, 530-4 coupled to the frame 515 by a plurality of extensions. The imaging device 550 is aligned to include at least one of the motors 530 within a field of view. The excitation source 570 is an acoustic speaker aligned to project acoustic energy in the form of sounds having any frequency, wavelength or intensity upon one or more portions of the aerial vehicle 510. Alternatively, or additionally, the aerial vehicle 510 may be excited by any other type or form of excitation source, e.g., a manual excitation source, or one or more of the motors 530-1, 530-2, 530-3, 530-4.

As is shown in FIG. 5B, a plurality of sets of pixels $P_{5A}$, $P_{5B}$, $P_{5C}$, $P_{5D}$, $P_{5E}$, $P_{5F}$ of an image plane of the imaging device 550 are shown. Each of such sets of pixels $P_{5A}$, $P_{5B}$, $P_{5C}$, $P_{5D}$, $P_{5E}$, $P_{5F}$ corresponds to one or more surfaces of the aerial vehicle 510 within the field of view of the imaging device 550. As is further shown in FIG. 5B, the set of pixels $P_{5A}$ corresponds to a surface of the motor 530-3, while the set of pixels $P_{5B}$ corresponds to a surface of a propeller coupled to the motor 530-4, and the set of pixels $P_{5C}$ corresponds to a surface of the frame 515 on a starboard side of the aerial vehicle 510, between the motor 530-1 and the motor 530-3. The set of pixels $P_{5D}$ corresponds to an upper surface of the frame 515, while the set of pixels $P_{5E}$ corresponds to a surface of the motor 530-1 and the set of pixels $P_{5F}$ corresponds to a surface of the motor 530-2. The locations of the sets of pixels $P_{5A}$, $P_{5B}$, $P_{5C}$, $P_{5D}$, $P_{5E}$, $P_{5F}$ may be selected to obtain a representation of the vibrometric behavior of the aerial vehicle 510 at such locations. Furthermore, the sets of pixels $P_{5A}$, $P_{5B}$, $P_{5C}$, $P_{5D}$, $P_{5E}$, $P_{5F}$ may include any number of pixels, including a single pixel corresponding to portions of the underlying surfaces of the aerial vehicle 510, or one or more clusters of such pixels at such locations.

As is also shown in FIG. 5B, a time series 52 in the form of a multi-dimensional array may be formed from the intensities of each of the sets of pixels $P_{5A}$, $P_{5B}$, $P_{5C}$, $P_{5D}$, $P_{5E}$, $P_{5F}$ as determined from an image **55-*i* captured using the imaging device 550. For example, a plurality of images 55-*i* captured using the imaging device 550 may be provided to a server 580, e.g., over a network, and the images may be processed to determine the intensities of the sets of pixels $P_{5A}$, $P_{5B}$, $P_{5C}$, $P_{5D}$, $P_{5E}$, $P_{5F}$ at such locations within each of the images. The server 580 may construct the time series 52 from each of such intensities and the n times at which the images 55-*i* were respectively captured, e.g., at intervals approximately equal to a reciprocal of a frame rate of the imaging device 550, or approximately one-half millisecond (0.5 ms) per frame, where a frame rate of the imaging device 550** is 2,000 frames per second.

As is shown in FIG. 5C, a plurality of power spectral densities may be generated based on the intensities of each of the sets of pixels $P_{5A}$, $P_{5B}$, $P_{5C}$, $P_{5D}$, $P_{5E}$, $P_{5F}$ as determined from the images 55-*i* captured using the imaging device 550. For example, a power spectral density 54-A may be generated for vibrations of the surface of the motor 530-3, while a power spectral density 54-B may be generated for vibrations of the surface of a propeller coupled to the motor 530-4, and a power spectral density 54-C may be generated for vibrations of the surface the frame 515 on the starboard side of the aerial vehicle 510. A power spectral density 54-D may be generated for vibrations of the upper surface of the frame 515, while a power spectral density 54-E may be generated for vibrations of the surface of the motor 530-1 and a power spectral density 54-F may be generated for vibrations of the surface of the motor 530-2. Once the power spectral densities 54-A, 54-B, 54-C, 54-D, 54-E, 54-F are generated, natural frequencies for the respective surfaces may be identified as frequencies for which absolute or local maximum power levels or energy levels of vibration are observed within the power spectral densities 54-A, 54-B, 54-C, 54-D, 54-E, 54-F.

Figure 6:
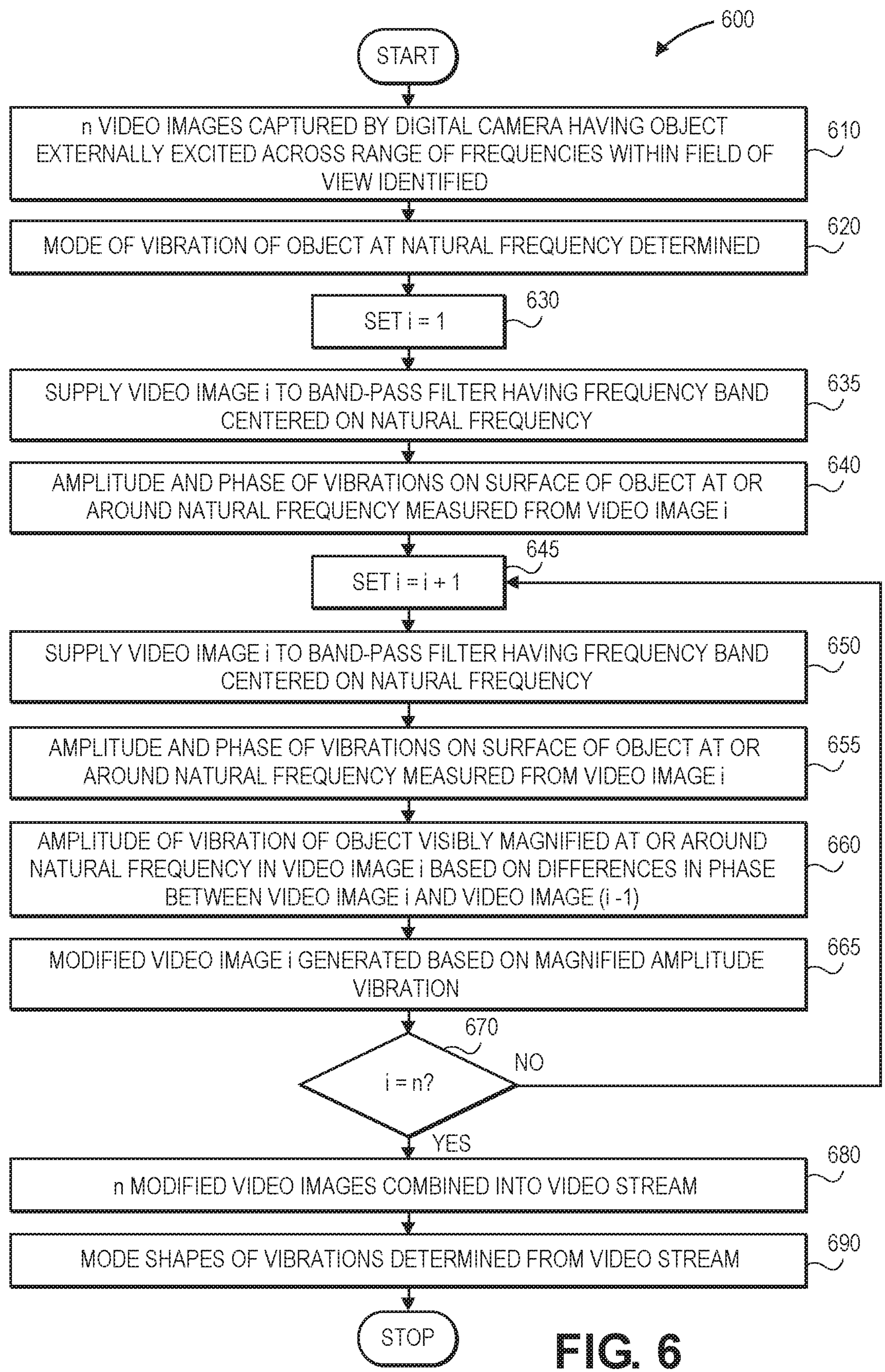
FIG. 6 is a flow chart of one process for visually determining vibrometric behavior of objects in accordance with embodiments of the present disclosure.

As is also discussed above, vibrations of objects at discrete frequencies may be identified and magnified based on imaging data captured as such objects are subjected to excitation, and used to generate a mode shape for the objects at natural frequencies of vibration for such objects. Referring to FIG. 6, a flow chart 600 of one process for visually determining vibrometric behavior of objects in accordance with embodiments of the present disclosure is shown. At box 610, n video images that were captured by a digital camera while an object (e.g., an aerial vehicle) is subject to extrinsic excitation across a range of frequencies within a field of view of the digital camera are identified. The n video images may be identified in real time or in near-real time, e.g., as the video images are captured with the object being subjected to extrinsic excitation, or at a later time, such as where the imaging data is time-stamped or otherwise marked or designated to correspond with given frequencies. Alternatively, the object may be excited by one or more intrinsic sources, e.g., an operating propulsion motor.

At box 620, modes of vibration at a natural frequency of the object are determined. For example, as is set forth above, one or more pixels may be identified or selected within each of the n video images, and the intensities of such pixels may be used to identify natural frequencies of vibration or natural vibrational modes of the object, such as by determining a power spectral density of the object from a time series of the intensities of the pixels across multiple frames, e.g., by a fast Fourier transform, and identifying frequencies at which absolute or local maximum power levels or energy levels of vibration are observed. Intensities of the selected pixels may be determined at a later time, e.g., after the vehicle has been subjected to the excitation. The natural frequency for which the modes of vibration are determined at box 620 may be a first-order mode of vibration, or any other number or ordinal of mode of vibration.

At box 630, a value of a step variable i is set equal to one, or i=1. At box 635, a video image i is supplied to a band-pass filter having a frequency band centered on the natural frequency of the object determined at box 620. For example, in some embodiments, the band-pass filter may include one or more components or systems for identifying portions of the video image i that depict objects vibrating at or around a natural frequency of the object, e.g., within a pass band centered on the natural frequency, and removing portions of the video image i that do not depict objects vibrating at or around the natural frequency, e.g., background features or foreground features that do not vibrate at or around the natural frequency. The band-pass filter thus filters frequencies of vibration that are above or beyond the boundaries of the pass band, e.g., sufficiently greater than or less than one or more of the natural frequencies of the object to which the band-pass filter is applied.

For example, in some embodiments, where an image depicting the object being subjected to excitation is provided to the band-pass filter as an input, a portion of the image depicting only aspects of the object that are vibrating at or around the natural frequency is identified as an output. A difference image, or a balance or remainder of the video image i after the portions depicting the aspects of the object vibrating at or around the natural frequency are extracted from the video image i, may also be identified based on the output. In some embodiments, aspects of the object that are vibrating at or around the natural frequency may be identified by providing the video image i to a high-pass filter, and then to a low-pass filter, or vice versa, rather than providing the video image i to a band-pass filter.

At box 640, amplitudes and phases of the vibrations on the surface of the object are measured from the video image i, at or around the natural frequency of vibration determined at box 620. As is discussed above, one or more portions of the video image i that depict aspects of the object vibrating at or near the natural frequency are identified or extracted from the video image i. The amplitudes and the phases may be determined in any manner, such as by performing a transformation of the video image i. For example, the portions may be provided to one or more algorithms that determine positions or orientations of the aspects of the object, and amplitudes or phases of the vibration may be determined from such portions.

At box 645, the value of the step variable i is further incremented by one, or i=i+1, and at box 650, a video image i is supplied to a band-pass filter having a frequency band centered on the natural frequency of the object. For example, as is discussed above with regard to box 635, a band-pass filter may identify or extract portions of the video image i that depict aspects of the object vibrating at or near the natural frequency, e.g., within a pass band, and remove the portions of the video image i that do not depict aspects of the object vibrating at or near the natural frequency.

At box 655, amplitudes and phases of the vibrations on the surface of the object are measured from the video image i, at or around the natural frequency. For example, where a first video image is supplied to the band-pass filter at box 635, and the amplitudes and phases of the vibrations on the surface of the object are measured from the first video image at box 640, a second video image is supplied to the band-pass filter at box 650, and amplitudes and phases of the vibrations on the surface of the object are measured from the second video image at box 655.

At box 660, the amplitude of vibration of the object is visibly magnified at or around the natural frequency of the object in the video image i, based on differences in phase observed between video image i and video image (i−1). At box 665, a modified video image i is generated based on the magnified vibration from box 660. The modified video image i depicts the overall vibration of the object, in a manner that is independent of phase.

At box 670, whether the value of the step variable i is equal to n is determined. If the value of the step variable i is not equal to n, then the process returns to box 645, where the value of the step variable i is further incremented by one, or i=i+1, before advancing to box 650, where another video image i is supplied to the band-pass filter, and to box 655, where amplitudes and phases of the vibrations on the surface of the object are measured from the other video image i.

If the value of the step variable i is equal to n, however, then each of the n video images has been subjected to band-pass filtering, and the vibration of the object depicted within each of the n video images has been visibly magnified at or around the natural frequency of the object. Thus, the process advances to box 680, where the n modified video images are combined into a video stream. For example, the n video images that are generated at box 665 may be subjected to a time series analysis on the motion for each frame. At box 690, mode shapes of the vibrations are determined from the amplitudes and phases of vibration, and the process ends. For example, the mode shape may be a spatial distribution or model of the behavior of the object or portions thereof in the presence of vibration at the natural frequency, may be generated at the natural frequency, and may be determined by an optical flow algorithm, a matching algorithm, or any other algorithm that receives the portions of the video images identified as depicting vibrating aspects of the object as inputs and determines disparities between pixels appearing within each of the images as outputs, or in any other manner.

Referring to FIGS. 7A through 7G, views of aspects of one system 700 for visually determining vibrometric behavior of objects in accordance with embodiments of the present disclosure are shown. Except where otherwise noted, reference numerals preceded by the number "7" shown in FIGS. 7A through 7G indicate components or features that are similar to components or features having reference numerals preceded by the number "5" shown in FIGS. 5A through 5C, by the number "4" shown in FIGS. 4A through 4C, by the number "2" shown in FIG. 2 or by the number "1" shown in FIGS. 1A through 1K.

Figure 7A:
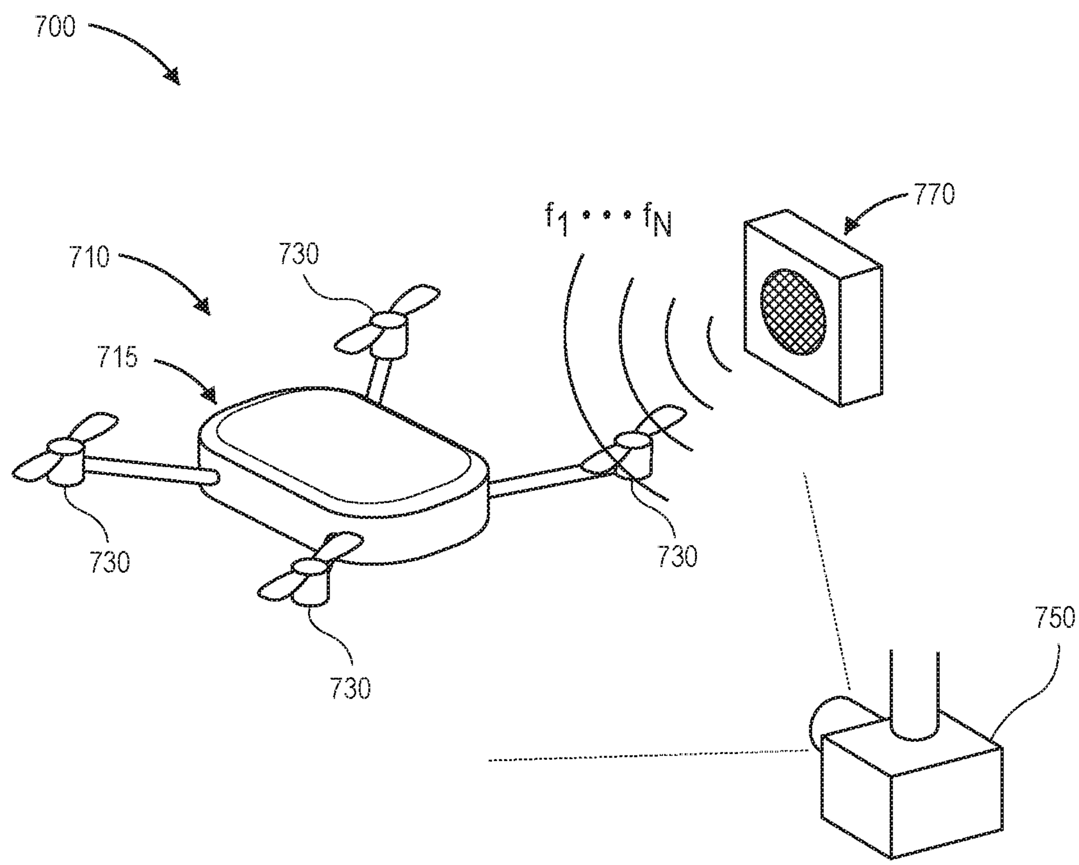
FIGS. 7A through 7G are views of aspects of one system for visually determining vibrometric behavior of objects in accordance with embodiments of the present disclosure.

As is shown in FIG. 7A, the system 700 includes an aerial vehicle 710, an imaging device 750 (e.g., a digital camera) and an acoustic speaker 770 (or another excitation source). The imaging device 750 is aligned to include all or portions of the aerial vehicle 710 within a field of view. The acoustic speaker 770 is also aligned to project acoustic energy in the form of sounds having any frequency, wavelength or intensity upon one or more portions of the aerial vehicle 710. Alternatively, any excitation source that is configured to excite the aerial vehicle 710 at known, selected frequencies $f_1 \ldots f_n$, with the aerial vehicle 710 within a field of view of the imaging device 750, e.g., by direct contact with the aerial vehicle 710 or in any other manner, may be utilized to impart excitation upon the aerial vehicle 710. For example, in some embodiments, one or more motors of the aerial vehicle 710 may act as an intrinsic excitation source for the aerial vehicle 710, where such motors 730 may be specifically controlled to impart excitation upon the aerial vehicle 710 at one or more selected frequencies within a known, defined range.

Figure 7B:
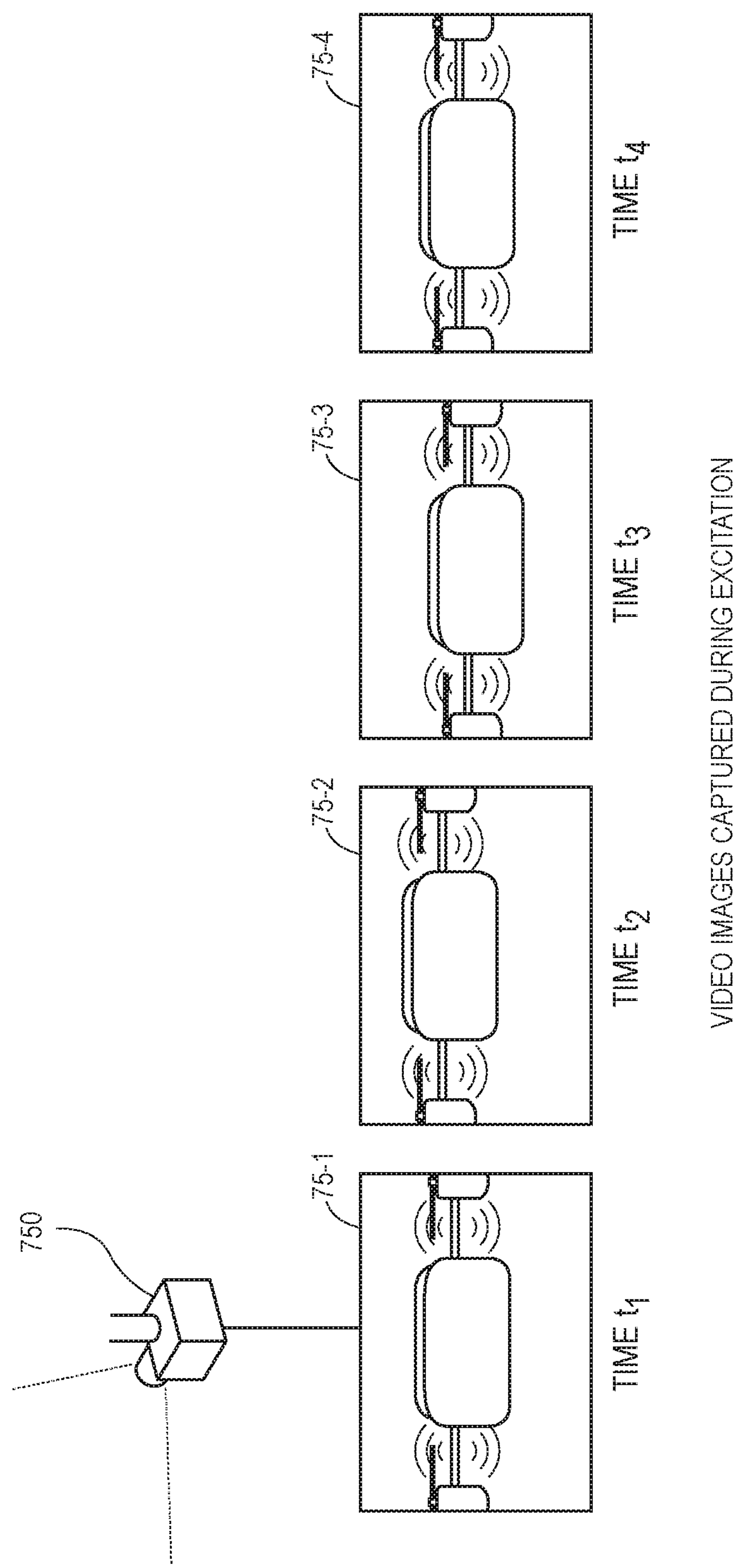

As is shown in FIG. 7B, a plurality of video images 75-1, 75-2, 75-3, 75-4 are captured by the imaging device 750 during the excitation of the aerial vehicle 710. In some embodiments, the imaging device 750 is programmed or configured to capture digital images at a high speed or frame rate, such as two thousand frames per second (2,000 fps), four thousand frames per second (4,000 fps), or preferably at least twice a maximum frequency of the excitation.

Figure 7C:
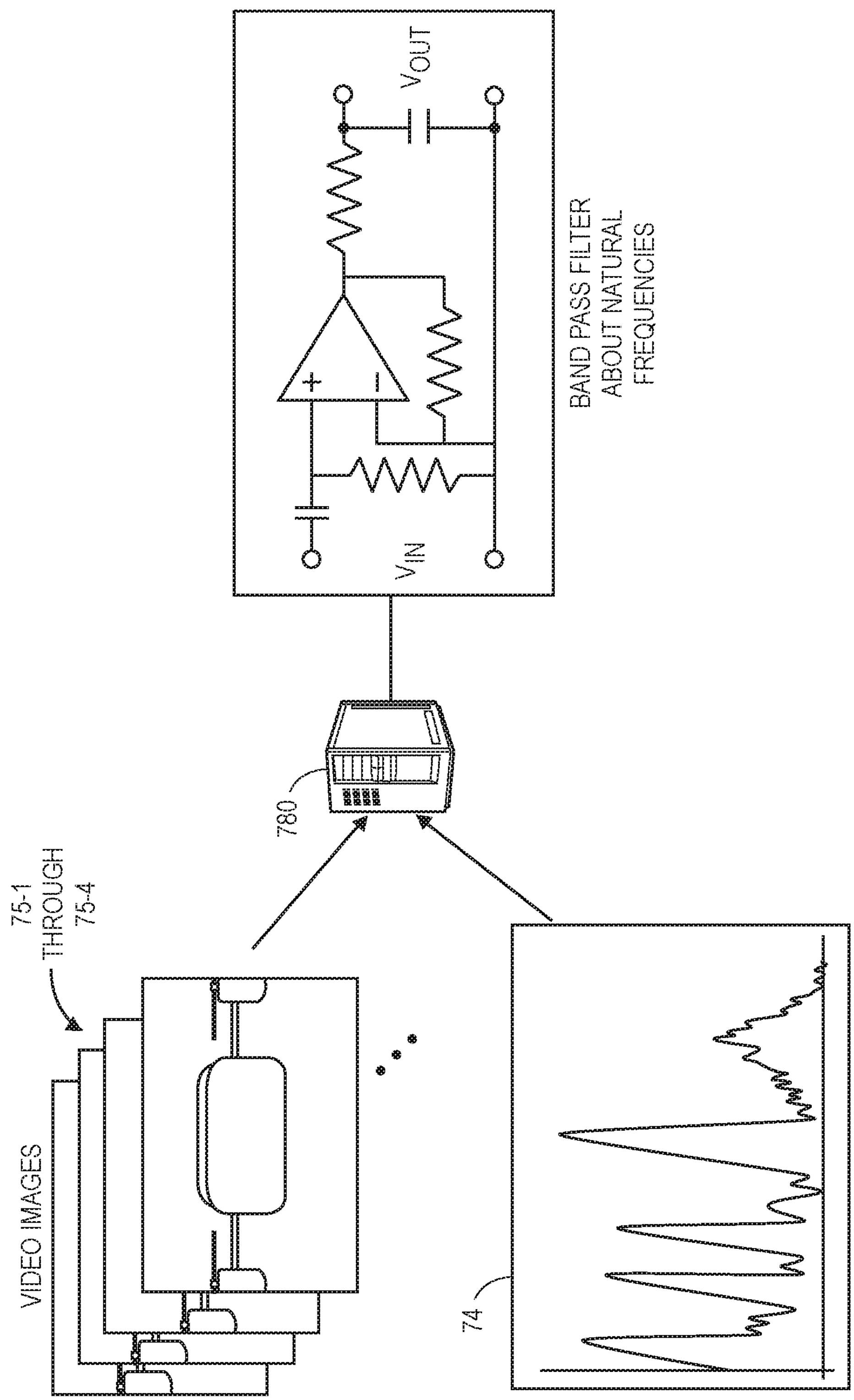

As is shown in FIG. 7C, the plurality of video images 75-1, 75-2, 75-3, 75-4 and a set of natural frequencies 74 of vibration of the aerial vehicle 710 are provided to a server 780 over one or more networks (not shown). The set of natural frequencies 74 may have been determined in any manner, such as by analyzing changes in intensity of one or more selected pixels over a range of frequencies, and generating a power spectral density identifying the set of natural frequencies 74 from such changes in intensity, or in any other manner. Each of the video images 75-1, 75-2, 75-3, 75-4 may be provided to a band-pass filter applied within a frequency band centered around one of the set of natural frequencies 74 to amplify the motion corresponding to the one of the set of natural frequencies 74. The width of the band-pass band may be selected on any basis. Alternatively, in some embodiments, the images 75-1, 75-2, 75-3, 75-4 may be provided first to a high-pass filter, and next to a low-pass filter, or vice versa, rather than to a band-pass filter.

Figure 7D:
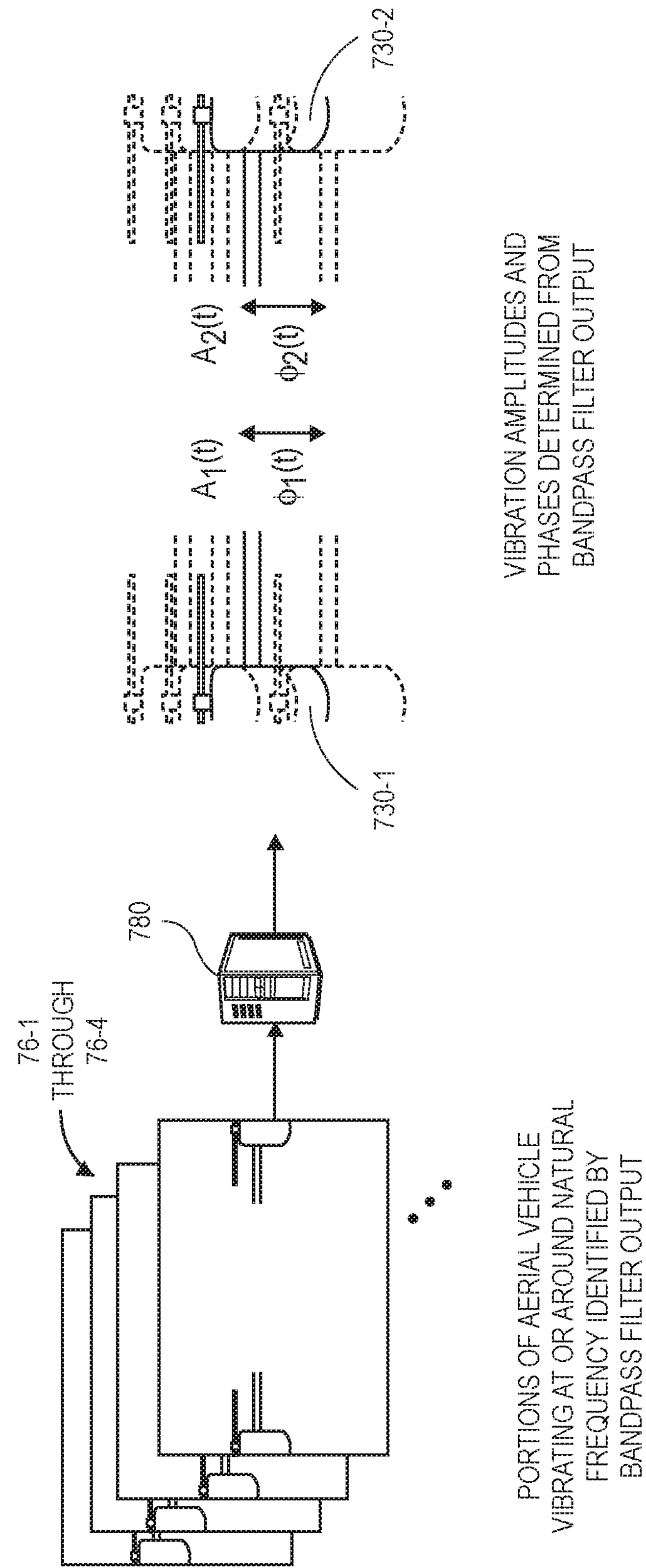

As is shown in FIG. 7D, portions 76-1, 76-2, 76-3, 76-4 of the images 75-1, 75-2, 75-3, 75-4 that depict aspects of the aerial vehicle 710 (e.g., a pair of motors and/or extensions) vibrating at or near natural frequencies of the aerial vehicle 710 are identified based on outputs from the band-pass filter of FIG. 7C. The portions 76-1, 76-2, 76-3, 76-4 depicting aspects of the aerial vehicle 710 vibrating at or near the natural frequencies of the aerial vehicle 710 are provided to a server 780, e.g., over a network. The server 780 may be configured to determine amplitudes and phases of the vibration of such aspects, including amplitudes $A_1(t)$, $A_2(t)$ and phases $\phi_1(t)$, $\phi_2(t)$ of the aspects of the aerial vehicle 710. For example, the portions 76-1, 76-2, 76-3, 76-4 may be supplied to an optical flow algorithm, a matching algorithm, or any other algorithm that is configured to determine disparities, displacements and/or parallax of objects within such images.

Figure 7E:
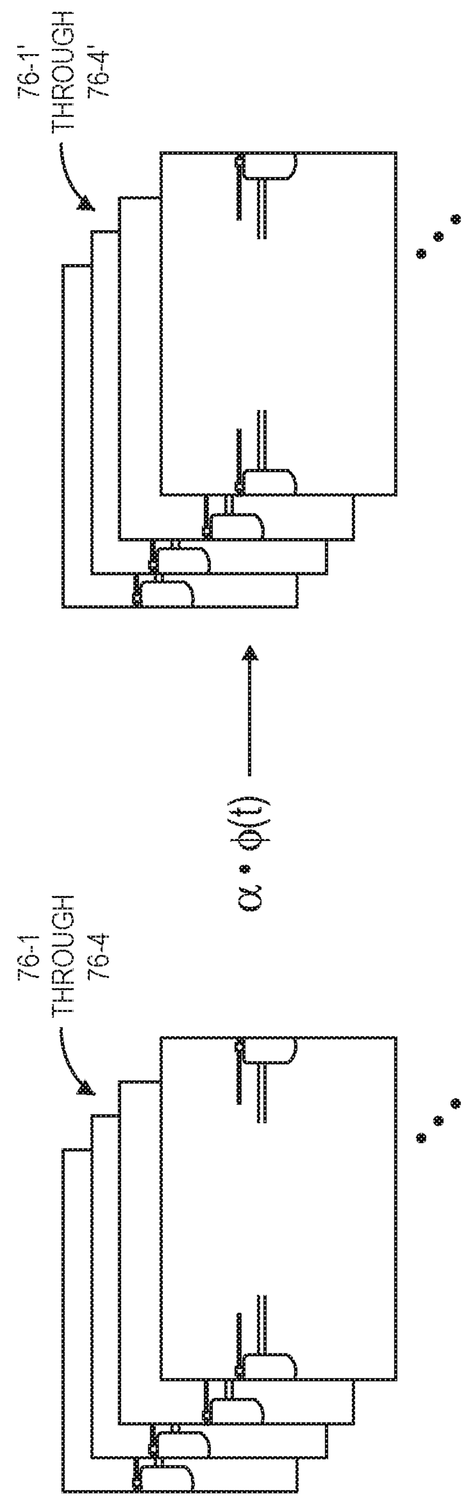

As is shown in FIG. 7E, the portions 76-1, 76-2, 76-3, 76-4 may be magnified to enhance the visibility of the vibration or other motion thereof by multiplying the values of the phases $\varphi_1(t)$, $\varphi_2(t)$ as a function of time of each of the aspects of the aerial vehicle 710 by an amplification factor $\alpha$. For example, multiplying each of the phases by the amplification factor $\alpha$ necessarily means that a difference between phases of vibration of different aspects of the aerial vehicle 710 within each image, or between phases of vibration of the same aspects within different images, will also be amplified accordingly. A set of imaging data 76-1', 76-2', 76-3', 76-4' depicting the modified portions 76-1, 76-2, 76-3, 76-4 may be generated accordingly.

Figure 7F:
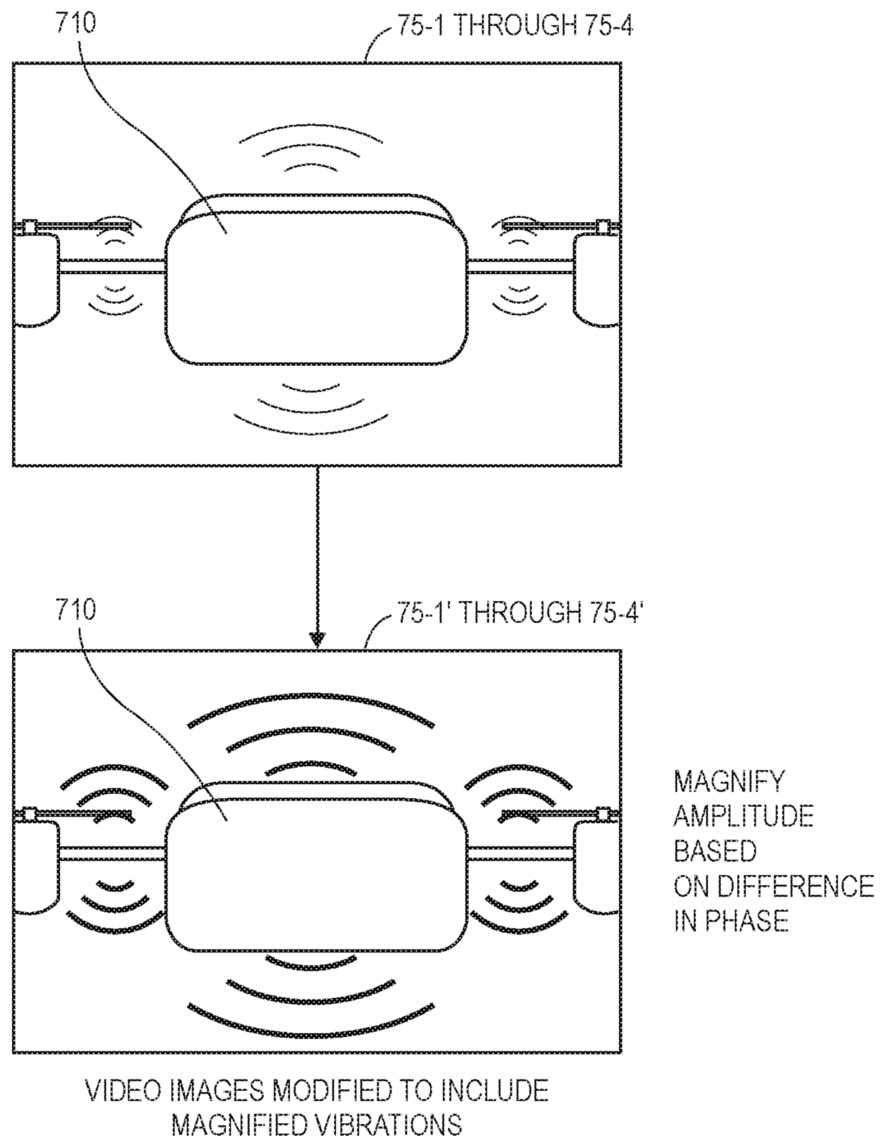

As is shown in FIG. 7F, the set of imaging data 76-1', 76-2', 76-3', 76-4' may be combined with the balances or remainders of the images 75-1, 75-2, 75-3, 75-4 from which the portions 76-1, 76-2, 76-3, 76-4 were extracted to form a modified set of imaging data 75-1', 75-2', 75-3', 75-4' that depicts the vibration of the aerial vehicle 710 in a magnified manner, e.g., based on the differences in phase as amplified by the amplification factor $\alpha$.

Figure 7G:
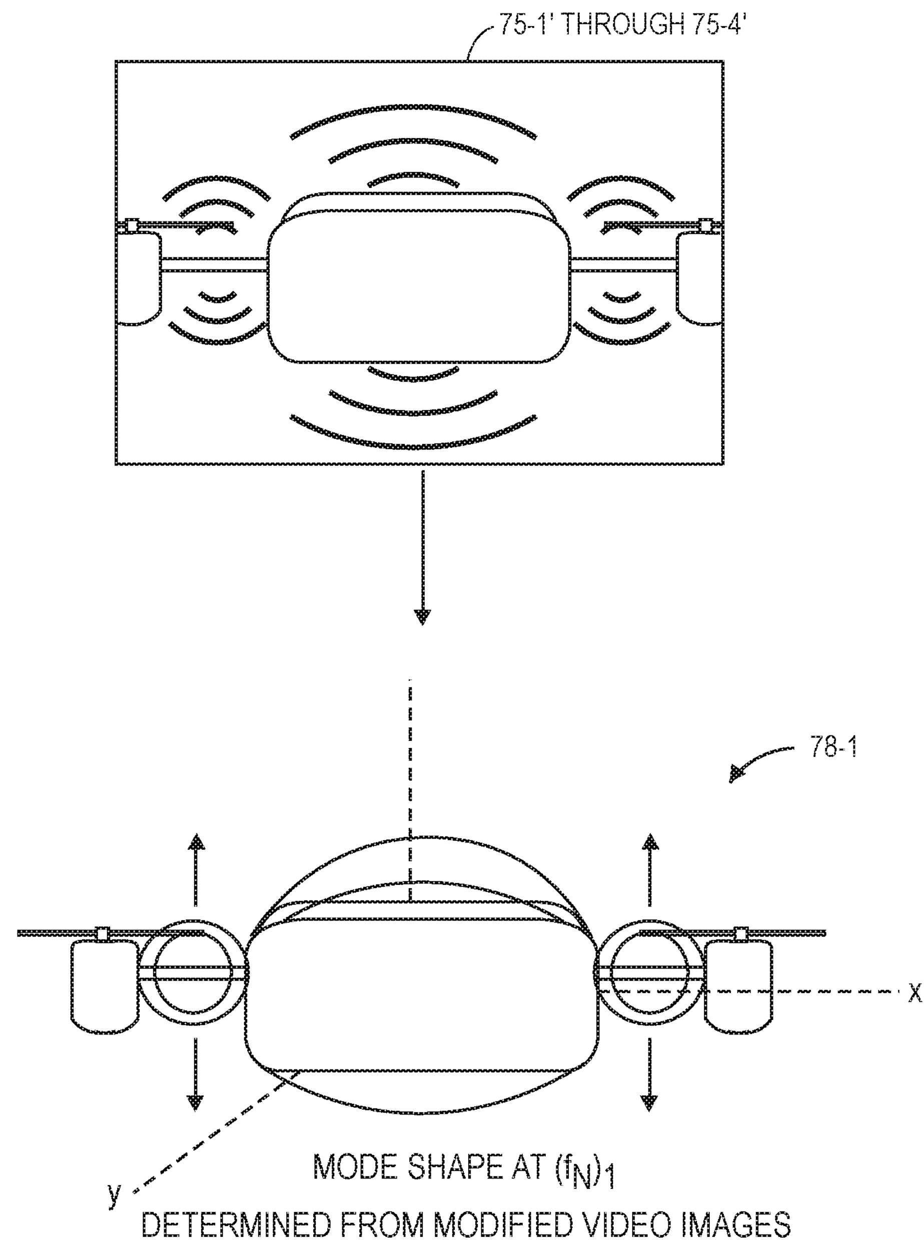

As is shown in FIG. 7G, a mode shape 78-1, or a spatial distribution or model of the behavior of the aerial vehicle 710 or portions thereof in the presence of vibration at the natural frequency $(f_N)_1$, is generated based on a stream of the imaging data 75-1', 75-2', 75-3', 75-4'. The mode shape 78-1 depicts the behavior of the aerial vehicle 710 at the natural frequency $(f_N)_1$, and may thus act as a visual tool for determining one or more actions or preemptive steps to be taken in order to prevent the aerial vehicle from vibrating at the natural frequency $(f_N)_1$, such as by imposing one or more operating constraints on the aerial vehicle 710, or by modifying the aerial vehicle 710 to ensure that the frequency $(f_N)_1$ is no longer a natural frequency of vibration or no longer results in harmful oscillations.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein may reference the determination of natural frequencies of vibration or natural vibrational modes for unmanned aerial vehicles that are configured to deliver payloads from warehouses or other like facilities to customers, those of ordinary skill in the pertinent arts will recognize that the systems and methods disclosed herein are not so limited, and may be utilized in connection with any object, including but not limited to any type or form of vehicle (e.g., manned or unmanned) or component thereof that is configured for any intended industrial, commercial, recreational or other use. In some embodiments, one or more of the objects for which natural frequencies of vibration or natural vibrational modes are determined in accordance with the present disclosure may be or include one or more components of an automobile, such as a manually operated or autonomous vehicle, or one or more components of an aerial vehicle other than an unmanned aerial vehicle, e.g., a jumbo jet, a cargo aircraft, or any other aerial vehicle.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:

an aerial vehicle;

an imaging device, wherein the aerial vehicle is within a field of view of the imaging device;

a speaker, wherein the speaker is aligned to emit acoustic energy onto the aerial vehicle; and a server in communication with each of the imaging device and the speaker, wherein the server is configured to at least:

project acoustic energy over a range of frequencies onto at least a portion of the aerial vehicle;

capture a first plurality of images by the imaging device, wherein each of the first plurality of images is captured with the acoustic energy projected onto at least the portion of the aerial vehicle;

select at least one pixel within an image plane of the imaging device, wherein the at least one pixel corresponds to at least the portion of the aerial vehicle in at least one of the first plurality of images;

determine a plurality of intensities of the at least one pixel, wherein each of the plurality of intensities is determined based on one of the first plurality of images;

determine a power spectral density of the aerial vehicle based at least in part on the plurality of intensities, wherein the power spectral density is determined based at least in part on a fast Fourier transform of a time series of the plurality of intensities;

determine a natural frequency of vibration of the aerial vehicle from the power spectral density;

provide each of the first plurality of images as inputs to a band-pass filter centered on the natural frequency of vibration;

determine, for each of the first plurality of images, a first amplitude of motion and a first phase of the motion of at least the portion of the aerial vehicle based at least in part on outputs from the band-pass filter;

determine, for each of the first plurality of images, a second phase of motion of at least the portion of the aerial vehicle, wherein the second phase is a product of the first phase and an amplification factor; and generate a second plurality of images, wherein each of the second plurality of images is a modified one of the first plurality of images including the second amplitude of the motion.

2. The system of claim 1, wherein the server is further configured to at least:

determine a mode shape of the aerial vehicle at the natural frequency based at least in part on the first amplitude of the motion of at least some of the first plurality of images.

3. The system of claim 1, wherein the at least one pixel corresponds to at least one of a frame or a motor of the aerial vehicle.

4. The system of claim 1, wherein each of the intensities is one of a grayscale value, a red channel value, a green channel value or a blue channel value of the at least one pixel within one of the first plurality of images.

5. A method comprising:

subjecting at least a first portion of a vehicle to excitation within a range of frequencies over a first period of time;

capturing a first plurality of images by an imaging device having at least the first portion of the vehicle within a first field of view, wherein each of the first plurality of images is captured with at least the first portion of the vehicle being subjected to the excitation over the first period of time;

selecting a set of pixels within an image plane of the imaging device, wherein at least a first subset of pixels of the set of pixels corresponds to the first portion of the vehicle;

determining, for each of the first plurality of images, first intensities of the at least some of the first subset of pixels;

determining, based at least in part on at least some of the first intensities, a power spectral density of at least the first portion of the vehicle; and identifying at least a first natural frequency of at least the first portion of the vehicle based at least in part on the power spectral density.

6. The method of claim 5, further comprising:

providing each of the first plurality of images as inputs to a band-pass filter, wherein the band-pass filter is centered on the first natural frequency;

determining, for each of the first plurality of images, an amplitude of motion of the first portion of the vehicle and a phase of the motion of the first portion of the vehicle based at least in part on outputs from the band-pass filter;

magnifying, for at least some of the first plurality of images, the amplitude of the motion of the first portion of the vehicle based at least in part on the phase of the motion of the first portion of the vehicle; and generating a second plurality of images, wherein each of the second plurality of images corresponds to one of the first plurality of images, and wherein each of the second plurality of images comprises the magnified amplitude of the motion of the first portion of the vehicle in the corresponding one of the first plurality of images.

7. The method of claim 6, wherein each of the outputs identifies a portion of one of the first plurality of images depicting the first portion of the vehicle vibrating within a pass band centered on the first natural frequency, wherein magnifying the amplitude of the motion of the first portion of the vehicle comprises:

modifying, for each of the first plurality of images, the portion of the one of the first plurality of images depicting the first portion of the vehicle vibrating within the pass band centered on the first natural frequency based at least in part on the phase of the motion of the first portion of the vehicle, and wherein generating the second plurality of images comprises:

combining each of the modified portions of the first plurality of images depicting the first portion of the vehicle with a balance of the one of the first plurality of images not including the portion of the one of the first plurality of images.

8. The method of claim 6, further comprising:

determining a mode shape of the first portion of the vehicle for the first natural frequency based at least in part on the amplitude of the motion of the first portion of the vehicle determined for each of the first plurality of images.

9. The method of claim 8, further comprising:

in response to determining the mode shape of the first portion of the vehicle for the first natural frequency, at least one of:

changing a mass of the vehicle;

replacing a component of the vehicle;

imposing at least one operating restriction upon the vehicle; or modifying a design of the vehicle.

10. The method of claim 5, wherein determining the power spectral density of at least the first portion of the vehicle comprises:

generating a time series comprising times at which each of the first plurality of images was captured and at least the first intensities; and transforming the time series, wherein the power spectral density comprises powers of vibration as a function of frequency.

11. The method of claim 10, wherein transforming the time series comprises:

applying a fast Fourier transform to at least a portion of the time series, wherein the power spectral density is an output of the fast Fourier transform.

12. The method of claim 5, wherein the first natural frequency is a frequency corresponding to one of an absolute maximum power or a local maximum power on the power spectral density.

13. The method of claim 5, wherein at least the first portion of the vehicle is subjected to excitation by at least one of:

an acoustic excitation source, wherein the acoustic excitation source is configured to project acoustic energy over the range of frequencies over the first period of time;

a manual excitation source, wherein the manual excitation source subjects the first portion of the vehicle to excitation over at least the range of frequencies upon contact with the vehicle prior to the first period of time; and an intrinsic component of the vehicle, wherein the intrinsic component of the vehicle is configured to rotate about the range of frequencies over the first period of time.

14. The method of claim 5, wherein the imaging device captures the first plurality of images at a rate that is at least one of:

not less than two thousand images per second; or not less than twice an upper limit of the range of frequencies.

15. The method of claim 5, wherein each of the first subset of pixels is associated with the first portion of the vehicle, wherein each of a second subset of pixels is associated with a second portion of the vehicle, wherein the method further comprises:

determining, for each of the second plurality of images, second intensities of the at least some of the second subset of pixels, and wherein determining the power spectral density comprises:

determining, based at least in part on at least some of the first intensities and the second intensities, the power spectral density of at least the first portion of the vehicle and the second portion of the vehicle.

16. The method of claim 15, wherein the first portion of the vehicle is a first one of an actuator, an aileron, a bracket, a brake, an elevator, an elevon, a flap, a fuselage, a junction, landing gear, a motor, a propeller, a rudder, a slat, a strut, a taileron, or a wing, and wherein the second portion of the vehicle is a second one of the actuator, the aileron, the bracket, the brake, the elevator, the elevon, the flap, the fuselage, the junction, landing gear, the motor, the propeller, the rudder, the slat, the strut, the taileron, or the wing.

17. A method comprising:

subjecting at least a first portion of a vehicle to excitation within a first range of frequencies over a first period of time;

capturing a first plurality of images by an imaging device having at least the first portion of the vehicle within a first field of view, wherein each of the first plurality of images is captured with at least the first portion of the vehicle being subjected to the excitation over the first period of time;

providing each of the first plurality of images as inputs to a band-pass filter, wherein the band-pass filter is centered on a natural frequency of vibration of at least the first portion of the vehicle;

determining, for each of the first plurality of images, an amplitude of motion of the first portion of the vehicle and a phase of the motion of the first portion of the vehicle based on outputs from the band-pass filter;

magnifying, for at least some of the first plurality of images, the amplitude of the motion of the first portion of the vehicle based at least in part on the phase of the motion of the first portion of the vehicle; and generating a second plurality of images, wherein each of the second plurality of images corresponds to one of the first plurality of images, and wherein each of the second plurality of images comprises the magnified amplitude of the motion of the first portion of the vehicle in the corresponding one of the first plurality of images.

18. The method of claim 17, further comprising:

selecting a set of pixels within an image plane of the digital camera, wherein at least a subset of pixels of the set of pixels corresponds to the first portion of the vehicle;

determining, for each of the first plurality of images, intensities of the at least some of the subset of pixels;

generating a time series from at least some of the intensities of the at least some of the subset of pixels;

determining, from the time series, a power spectral density of at least the first portion of the vehicle; and identifying the natural frequency of vibration of at least the first portion of the vehicle based at least in part on the power spectral density.

19. The method of claim 17, further comprising:

determining a mode shape of the first portion of the vehicle based at least in part on the second plurality of images.

20. The method of claim 17, wherein the first portion of the vehicle is at least one of an actuator, an aileron, a bracket, a brake, an elevator, an elevon, a flap, a fuselage, a junction, landing gear, a motor, a propeller, a rudder, a slat, a strut, a taileron, or a wing.

* * * * *